United States Patent
Ono et al.

(10) Patent No.: US 11,418,714 B2
(45) Date of Patent: *Aug. 16, 2022

(54) IMAGE PROCESSING DEVICE, METHOD OF PROCESSING IMAGE, IMAGE PROCESSING PROGRAM, AND IMAGING DEVICE

(71) Applicant: Sony Group Corporation, Tokyo (JP)

(72) Inventors: Toshiki Ono, Tokyo (JP); Ryuji Shibata, Kanagawa (JP)

(73) Assignee: Sony Group Corporation, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 16/924,956

(22) Filed: Jul. 9, 2020

(65) Prior Publication Data
US 2020/0344407 A1    Oct. 29, 2020

Related U.S. Application Data

(63) Continuation of application No. 16/557,240, filed on Aug. 30, 2019, now Pat. No. 10,771,674, which is a
(Continued)

(30) Foreign Application Priority Data

Jul. 23, 2013    (JP) ................. 2013-152937

(51) Int. Cl.
*H04N 5/232* (2006.01)
*G06V 10/42* (2022.01)
(Continued)

(52) U.S. Cl.
CPC ....... *H04N 5/232939* (2018.08); *G06T 5/003* (2013.01); *G06V 10/42* (2022.01);
(Continued)

(58) Field of Classification Search
CPC ....... H04N 5/232939; H04N 5/232935; H04N 5/23213; H04N 5/23218; H04N 5/232122;
(Continued)

(56) References Cited

U.S. PATENT DOCUMENTS

| | | |
|---|---|---|
| 4,794,459 A | 12/1988 | Moberg et al. |
| 6,208,748 B1 | 3/2001 | Troccolo |

(Continued)

FOREIGN PATENT DOCUMENTS

| | | |
|---|---|---|
| EP | 2048878 A1 | 4/2009 |
| JP | 2002-112008 A | 4/2002 |

(Continued)

OTHER PUBLICATIONS

European Patent Office Brief Communication dated Nov. 2, 2021 for corresponding European Application No. 14755170.
(Continued)

*Primary Examiner* — Manav Seth
(74) *Attorney, Agent, or Firm* — Michael Best & Friedrich LLP

(57) ABSTRACT

An information processing system configured to perform predetermined processing based on out-of-focus information corresponding to a first area of an image, the out-of-focus information corresponding to a difference in focus between the first area of the image and a second area of the image that is different from the first area of the image.

21 Claims, 36 Drawing Sheets

Related U.S. Application Data continuation of application No. 14/894,435, filed as application No. PCT/JP2014/070143 on Jul. 22, 2014, now Pat. No. 10,440,251.

(51) Int. Cl.
  *G06V 40/16* (2022.01)
  *G06T 5/00* (2006.01)
(52) U.S. Cl.
  CPC ....... *G06V 40/161* (2022.01); *H04N 5/23218* (2018.08); *H04N 5/23219* (2013.01); *H04N 5/232122* (2018.08); *H04N 5/232123* (2018.08); *H04N 5/232935* (2018.08)
(58) Field of Classification Search
  CPC .. H04N 5/23219; G06V 10/42; G06V 40/161; G06K 9/00228; G06K 9/52; G06T 5/003
  See application file for complete search history.

(56) References Cited

U.S. PATENT DOCUMENTS

| | | | |
|---|---|---|---|
| 6,229,568 B1 | 5/2001 | Kawaguchi et al. | |
| 6,473,326 B2 | 10/2002 | Higashihara et al. | |
| 6,526,232 B1 | 2/2003 | Mizumura | |
| 6,538,249 B1 | 3/2003 | Takane et al. | |
| 6,570,566 B1 | 5/2003 | Yoshigahara | |
| 6,937,284 B1 | 8/2005 | Singh et al. | |
| 6,956,612 B2 | 10/2005 | Bean et al. | |
| 7,030,351 B2 | 4/2006 | Wasserman et al. | |
| 7,034,883 B1* | 4/2006 | Rosenqvist | H04N 5/23212 348/345 |
| 7,053,953 B2 | 5/2006 | Belz et al. | |
| 7,289,143 B2 | 10/2007 | Takagi et al. | |
| 7,432,975 B2 | 10/2008 | Lee | |
| 7,536,094 B2 | 5/2009 | Ichimiya | |
| 7,634,187 B2 | 12/2009 | Li et al. | |
| 7,821,545 B2 | 10/2010 | Sato | |
| 7,821,570 B2 | 10/2010 | Gallagher et al. | |
| 7,860,388 B2* | 12/2010 | Tsujimoto | H04N 5/232123 396/147 |
| 8,558,942 B2 | 10/2013 | Murata | |
| 8,749,695 B2 | 6/2014 | Kita | |
| 9,174,860 B2 | 10/2015 | Wernersson et al. | |
| 10,440,251 B2* | 10/2019 | Ono | H04N 5/23219 |
| 2004/0217257 A1 | 11/2004 | Fiete et al. | |
| 2005/0212817 A1 | 9/2005 | Cannon et al. | |
| 2009/0161961 A1 | 6/2009 | Kim et al. | |
| 2009/0195666 A1 | 8/2009 | Chen et al. | |
| 2010/0061642 A1 | 3/2010 | Kondo et al. | |
| 2010/0214540 A1 | 8/2010 | Sajadi et al. | |
| 2011/0019502 A1 | 1/2011 | Eick et al. | |
| 2011/0199502 A1 | 8/2011 | Okamura | |
| 2011/0234818 A1 | 9/2011 | Sugihara | |
| 2011/0270580 A1 | 11/2011 | Hedlund et al. | |
| 2011/0317768 A1 | 12/2011 | Liu et al. | |
| 2012/0075492 A1 | 3/2012 | Nanu et al. | |
| 2012/0148109 A1 | 6/2012 | Kawamura et al. | |
| 2012/0194707 A1 | 8/2012 | Koyama et al. | |
| 2013/0177254 A1 | 7/2013 | Nattress | |
| 2014/0013273 A1 | 1/2014 | Ng | |
| 2014/0233853 A1* | 8/2014 | Fransson | H04N 5/232123 382/173 |
| 2015/0215519 A1 | 7/2015 | Nattress | |
| 2016/0171651 A1 | 6/2016 | Lee et al. | |
| 2016/0217346 A1 | 7/2016 | Puetter et al. | |
| 2016/0269620 A1 | 9/2016 | Romanenko et al. | |
| 2017/0124928 A1 | 5/2017 | Edwin et al. | |

FOREIGN PATENT DOCUMENTS

| | | | |
|---|---|---|---|
| JP | 2006166212 A | 6/2006 | |
| JP | 2006166226 A | 6/2006 | |
| JP | 2007-116437 A | 5/2007 | |
| JP | 2008-233470 A | 10/2008 | |
| JP | 2009-188697 A | 8/2009 | |
| JP | 2010-146264 A | 7/2010 | |
| JP | 2011-146957 A | 7/2011 | |
| JP | 2011-155420 A | 8/2011 | |
| JP | 2011-166641 A | 8/2011 | |
| JP | 2011-199740 A | 10/2011 | |
| JP | 2013-090010 A | 5/2013 | |
| JP | 5824364 B2 | 11/2015 | |
| WO | 2010070732 A1 | 6/2010 | |
| WO | 2013/080552 A1 | 6/2013 | |

OTHER PUBLICATIONS

Japanese Office Action dated Nov. 11, 2016 for corresponding Japanese Application No. 2013-152937.

European Patent Office Communication Pursuant to Article 94 (3) dated Apr. 23, 2020 for related European Application No. 14755170.9.

European Patent Office Communication Pursuant to Article 94(3) EPC dated Apr. 23, 2020 for corresponding European Application No. 14755170.9.

European Patent Office Summons to Attend Oral Proceedings Pursuant to Rule 115(1) EPC dated Jul. 2, 2021 for corresponding European Application No. 14755170.9.

* cited by examiner

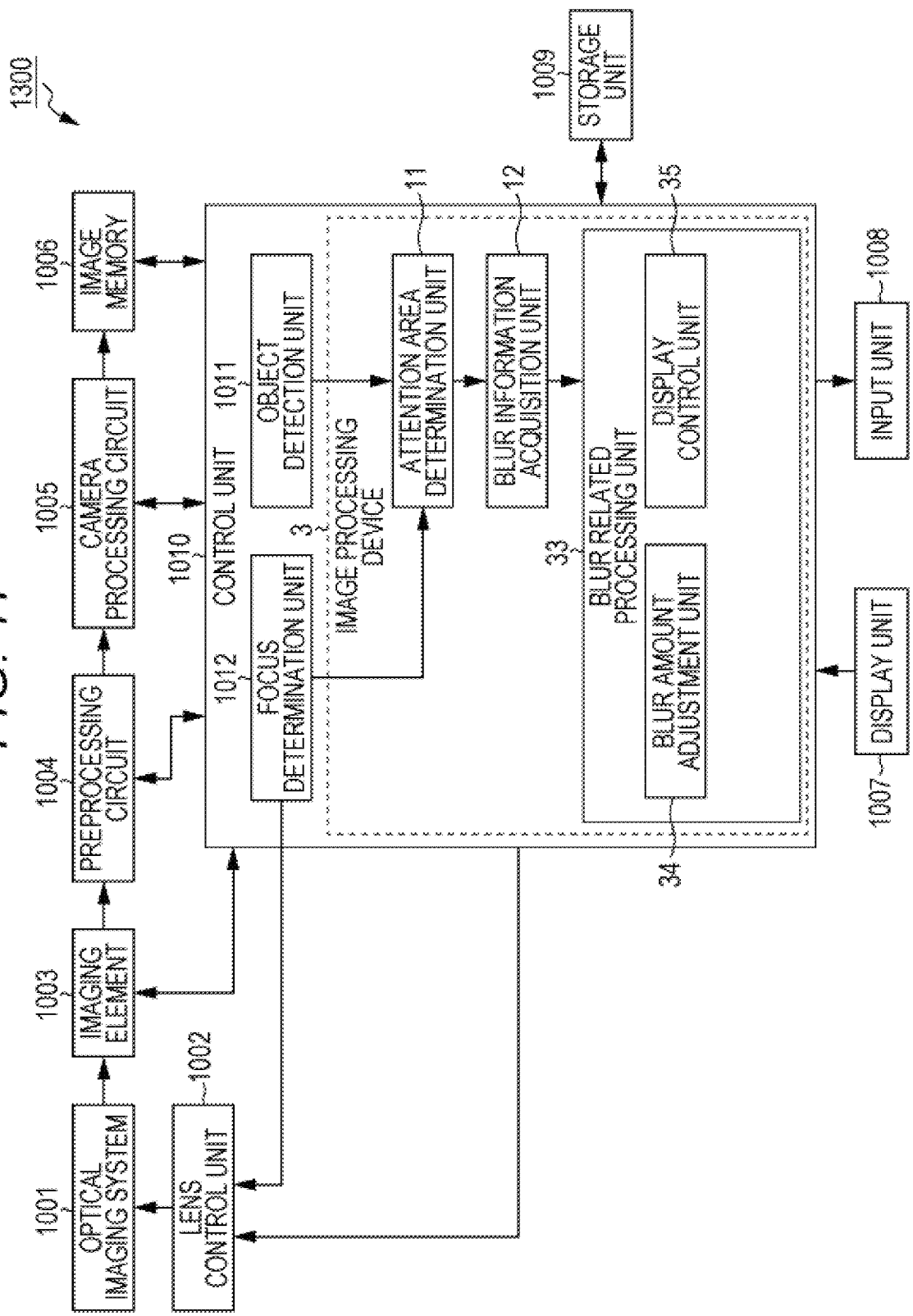

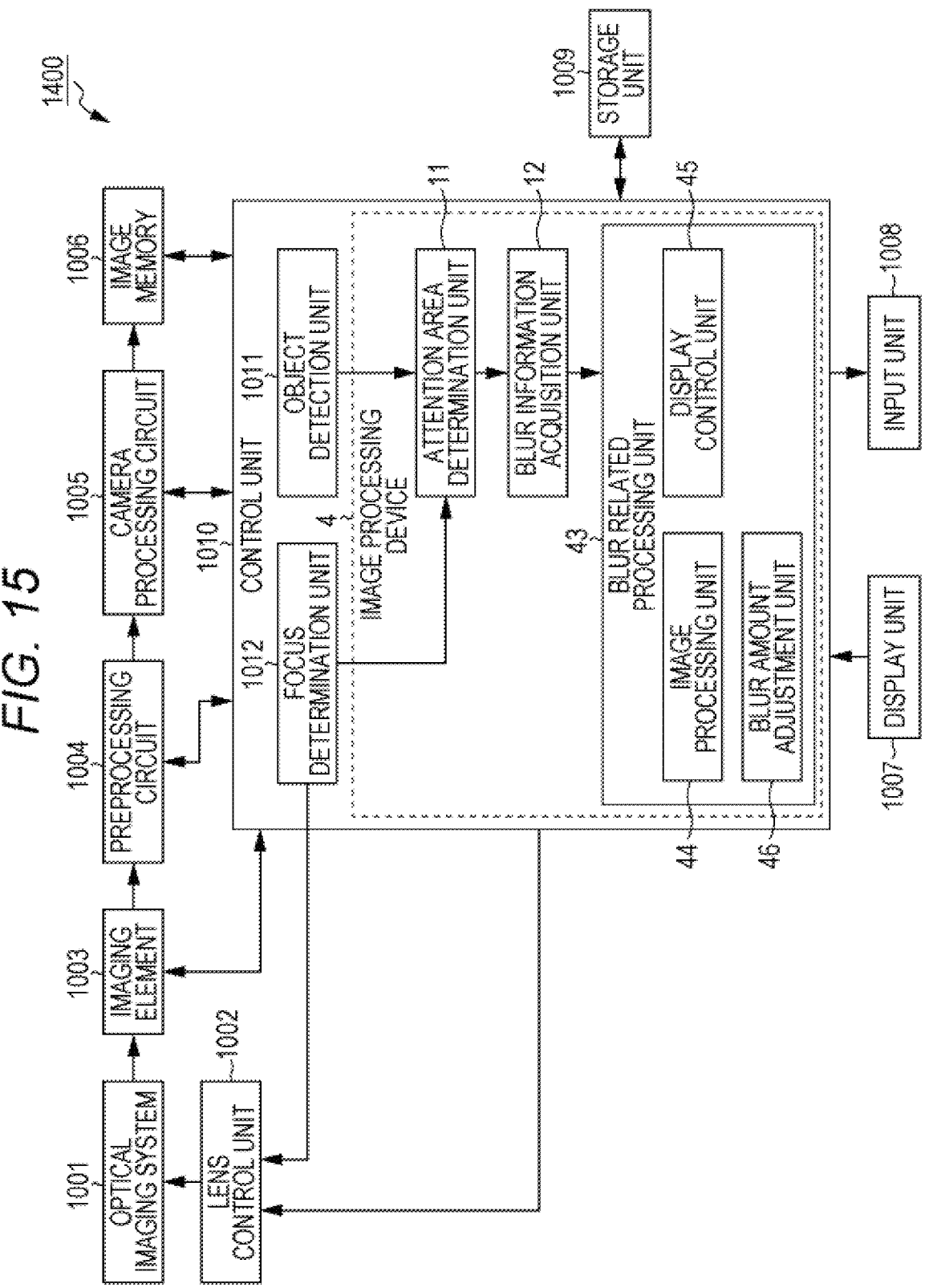

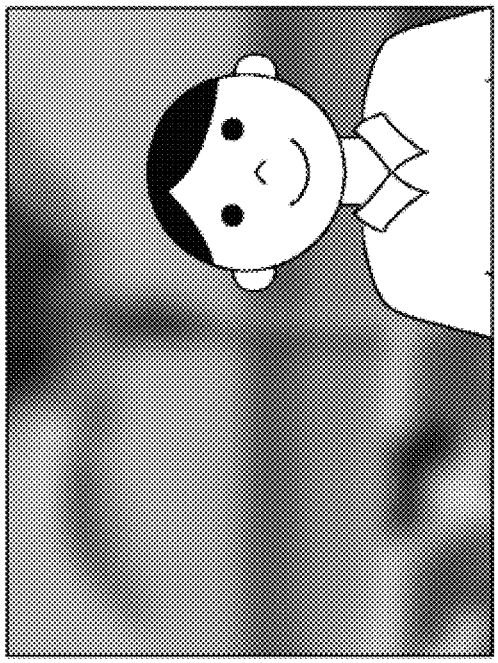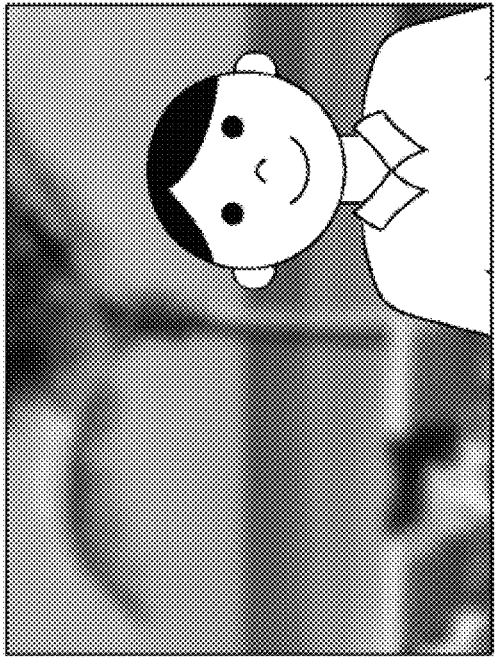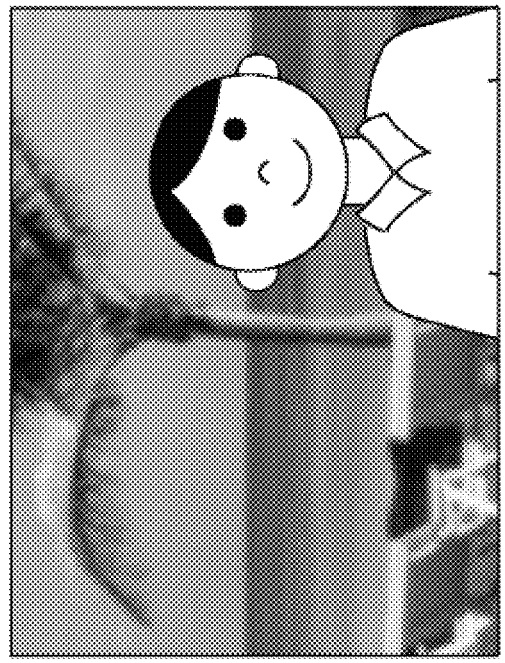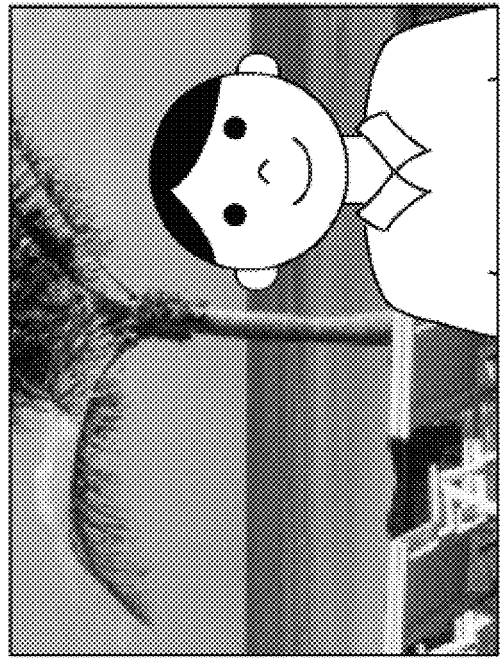

IMAGE PROCESSING DEVICE, METHOD OF PROCESSING IMAGE, IMAGE PROCESSING PROGRAM, AND IMAGING DEVICE

CROSS REFERENCE TO RELATED APPLICATIONS

This application is a Continuation Application of application Ser. No. 16/557,240, filed Aug. 30, 2019 which is a Continuation Application of application Ser. No. 14/894,435, filed Nov. 27, 2015, which issued as U.S. Pat. No. 10,440,251 on Oct. 8, 2019 which is a 371 Nationalization of PCT/JP2014/070143, filed Jul. 22, 2014 and claims the benefit of Japanese Priority Patent Application JP 2013-152937 filed on Jul. 23, 2013, the entire contents of which are incorporated herein by reference.

TECHNICAL FIELD

The present technology relates to an image processing device, a method of processing an image, an image processing program, and an imaging device.

BACKGROUND ART

In recent years, imaging devices, such as digital cameras, have been widely spread, and there are some imaging devices provided with a function to automatically and optimally adjust focus and exposure according to an image capturing scene. However, special stage effects, such as adjustment of a composition and shading off of a background at the time of capturing an image, are still largely depending on skills of users. Especially, for beginners who do not have knowledge of cameras, it is difficult to capture an image with the special staging effects. Therefore, in recent years, many technologies to shade off the background, and the like have been proposed (PTL 1).

CITATION LIST

Patent Literature

[PTL 1]
JP 2008-233470A

SUMMARY

Many of related technologies detect an object, and set a diaphragm according to information of the object. To be specific, the technologies detect a face of a person, and set a diaphragm according to information of the size, position, direction or the like of the face. Such a diaphragm determination technique is automatically controlled, and thus there is a possibility that an image is captured against intension of the user.

The present technology has been made in view of such a problem, and there is a need for providing an image processing device, a method of processing an image, an image processing program, and an imaging device that enable easy acquisition of a blurred image by performing processing based on information related to blur in the image.

Solution to Problem

To solve the above problem, a first technology is an information processing system configured to perform pre-determined processing based on out-of-focus information corresponding to a first area of an image, the out-of-focus information corresponding to a difference in focus between the first area of the image and a second area of the image that is different from the first area of the image.

Advantageous Effects of Invention

According to an embodiment of the present technology, processing is performed based on information related to blur in an image, whereby the user can easily acquire a blurred image.

BRIEF DESCRIPTION OF DRAWINGS

FIG. 11 is a block diagram illustrating a configuration of an imaging device provided with a function of an image processing device according to a third embodiment.

FIG. 15 is a block diagram illustrating a configuration of an imaging device provided with a function of an image processing device according to a fourth embodiment.

FIGS. 32A to 32D are diagrams illustrating images acquired by diaphragm bracket image capturing in the ninth embodiment.

DESCRIPTION OF EMBODIMENTS

Hereinafter, embodiments of the present technology will be described with reference to drawings. Note that description will be given in the following order.
<1. First Embodiment>
  [1-1. Configurations of an image processing device and an imaging device including the image processing device]
  [1-2. Processing in an image processing device and an imaging device]
<2. Second Embodiment>
  [2-1. Configurations of an image processing device and an imaging device including the image processing device]
  [2-2. Processing in an image processing device and an imaging device]
<3. Third Embodiment>
  [3-1. Configurations of an image processing device and an imaging device including the image processing device]
  [3-2. Processing in an image processing device and an imaging device]
<4. Fourth Embodiment>
  [4-1. Configurations of an image processing device and an imaging device including the image processing device]
  [4-2. Processing in an image processing device and an imaging device]
<5. Fifth Embodiment>
  [5-1. Configurations of an image processing device and an imaging device including the image processing device]
  [5-2. Processing in an image processing device and an imaging device]
<6. Sixth Embodiment>
  [6-1. Configurations of an image processing device and an imaging device including the image processing device]
  [6-2. Processing in an image processing device and an imaging device]
<7. Seventh Embodiment>
  [7-1. Configurations of an image processing device and an imaging device including the image processing device]
  [7-2. Processing in an image processing device and an imaging device]
<8. Eighth Embodiment>
  [8-1. Configurations of an image processing device and an imaging device including the image processing device]
  [8-2. Processing in an image processing device and an imaging device]
<9. Ninth Embodiment>
  [9-1. Configurations of an image processing device and an imaging device including the image processing device]
  [9-2. Processing in an image processing device and an imaging device]
<10. Tenth Embodiment>
  [10-1. Configurations of an image processing device and an imaging device including the image processing device]
  [10-2. Processing in an image processing device and an imaging device]
<11. Modifications>

1. First Embodiment

[1-1. Configurations of an Image Processing Device and an Imaging Device Provided with the Image Processing Device]

Figure 1:
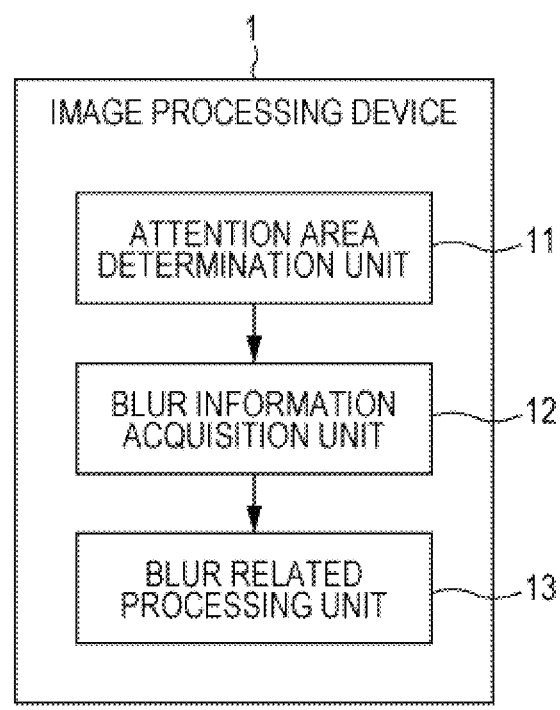
FIG. 1 is a block diagram illustrating a configuration of an image processing device according to an embodiment of a present technology.

First, configurations of an image processing device 1 and an imaging device 1100 provided with a function of the image processing device 1 according to a first embodiment will be described. FIG. 1 is a block diagram illustrating the image processing device 1.

The image processing device 1 is configured from an attention area determination unit 11, a blur information acquisition unit 12, and a blur related processing unit 13. The image processing device 1 is operated in an imaging device, for example.

Figure 2:
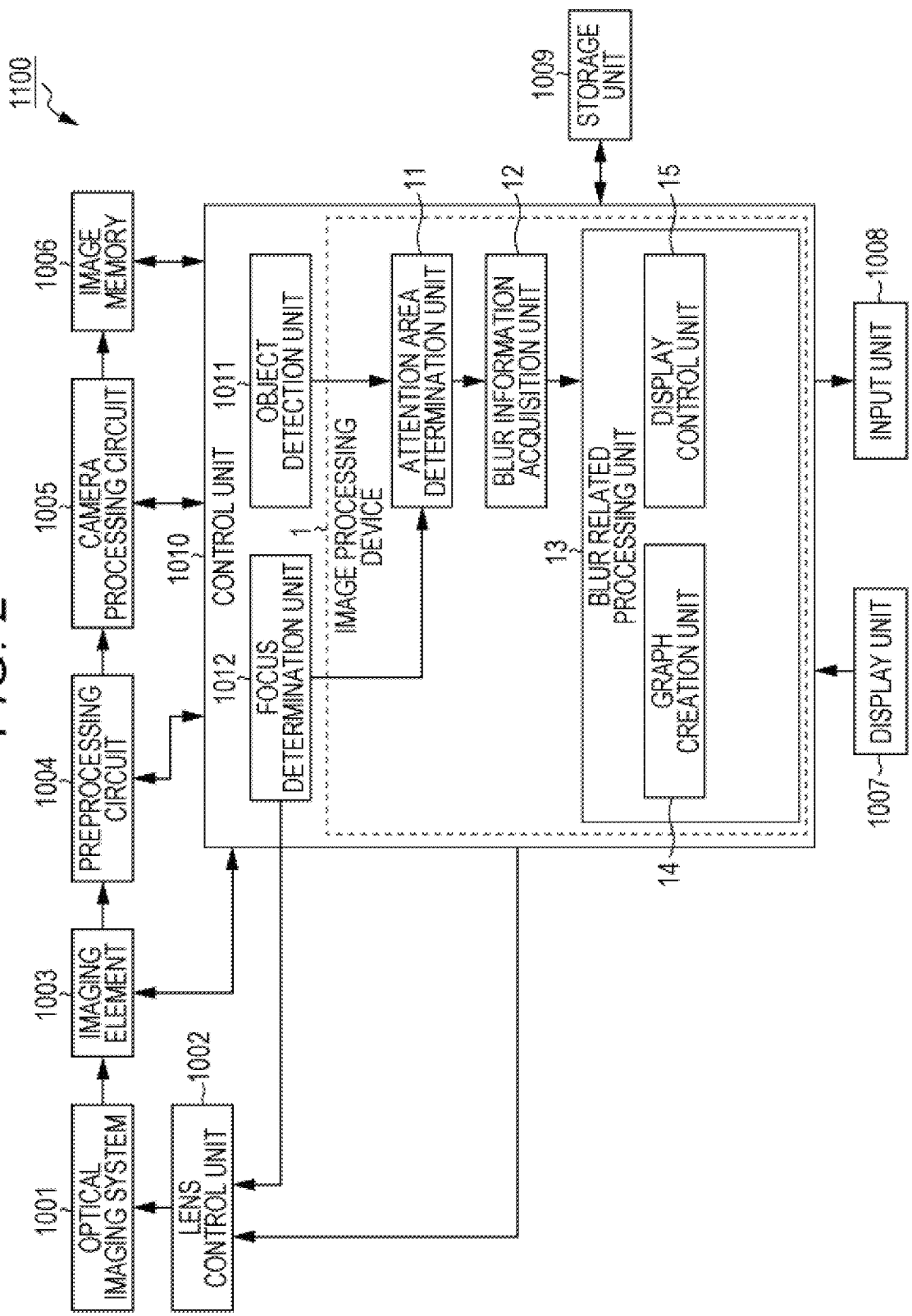
FIG. 2 is a block diagram illustrating a configuration of an imaging device provided with a function of an image processing device according to a first embodiment.

FIG. 2 is a block diagram illustrating a configuration of the imaging device 1100 provided with a function of the image processing device 1. The imaging device 1100 is configured from an optical imaging system 1001, a lens control unit 1002, an imaging element 1003, a preprocessing circuit 1004, a camera processing circuit 1005, an image memory 1006, a display unit 1007, an input unit 1008, a storage unit 1009, and a control unit 1010. Further, the control unit 1010 functions as an object detection unit 1011, a focus determination unit 1012, and an attention area determination unit 11, a blur information acquisition unit 12, and a blur related processing unit 13, which configure the image processing device 1. In the first embodiment, the blur related processing unit 13 functions as a graph creation unit 14 and a display control unit 15.

The optical imaging system 1001 is configured from an image capturing lens for collecting light from an object to the imaging element 1003, a drive mechanism for moving the image capturing lens and performing focusing and zooming, a shutter mechanism, an iris mechanism, and the like. These lens and mechanisms are driven by control of the lens control unit 1002. An optical image of the object obtained through the optical imaging system 1001 is formed on the imaging element 1003.

The lens control unit 1002 is a microcomputer in a lens, for example, and controls operations of the drive mechanism, the shutter mechanism, and the iris mechanism of the optical imaging system 1001, and the like, according to control from the control unit 1010 and the image adjustment unit 12. This enables adjustment of an exposure time (shutter speed), a diaphragm value (F-number), and the like.

The imaging element 1003 photoelectrically converts incident light from an object to convert it into a charge amount, and outputs the charge amount as an analog imaging signal. The analog imaging signal output from the imaging element 1003 is output to the preprocessing circuit 1004. As the imaging element 1003, a charge coupled device (CCD), a complementary metal oxide semiconductor, or the like is used.

The preprocessing circuit 1004 samples and holds the imaging signal output from the imaging element 1003 by correlated double sampling (CDS) processing to favorably maintain a signal/noise (S/N) ratio. Further, the preprocessing circuit 1004 controls a gain by auto gain control (AGC) processing, performs analog/digital (A/D) conversion, and outputs a digital image signal. These pieces of processing are performed according to control from the control unit 1010. The camera processing circuit 1005 applies, to an image signal from the preprocessing circuit 1004, signal processing, such as white balance adjustment processing, color correction processing, gamma correction processing, Y/C conversion processing, and auto exposure (AE) processing.

The image memory 1006 is a volatile memory, for example, a buffer memory configured from a dynamic random access memory (DRAM). The image memory 1006 temporarily stores image data to which predetermined processing has been applied by the preprocessing circuit 1004 and the camera processing circuit 1005.

The display unit 1007 is a display device configured from a liquid crystal display (LCD), a plasma display panel (PDP), an organic electro luminescence (EL) panel, or the like, for example. In the display unit 1007, a through image during imaging, a captured image recorded in the storage unit 1009, and the like are displayed.

The input unit 1008 is made of a power button for switching power ON/OFF, a release button for instructing start of recording of an imaging image, an operator for zoom adjustment, a touch screen integrally configured with the display unit 1007, and the like. When an input is given to the input unit 1008, a control signal according to the input is generated and output to the control unit 1010. The control unit 1010 then performs arithmetic processing and control corresponding to the control signal.

The storage unit 1009 is a mass storage medium, such as a hard disk, a memory stick (a registered trademark of Sony Corporation), or an SD memory card. An image is stored in a compressed state based on a standard, such as Joint Photographic Experts Group (JPEG), for example. Further, exchangeable image file format (EXIF) data including information related to the stored image and additional information such as a date and time of imaging is also stored in association with the image.

The control unit 1010 is configured from a central processing unit (CPU), a random access memory (RAM), and a read only memory (ROM), and the like. In the ROM, programs read and operated by the CPU are stored. The RAM is used as a work memory of the CPU. The CPU executes various types of processing according to the programs stored in the ROM, and controls the entire imaging device 1100 by issuing commands.

Further, the control unit 1010 functions as the object detection unit 1011, the focus determination unit 1012, and the attention area determination unit 11, the blur information acquisition unit 12, and the blur related processing unit 13, which configure the image processing device 1, by executing predetermined programs. However, these configurations are not only realized by the programs, but may also be realized by a combination of a dedicated device by hardware that has the above functions, a circuit, and the like.

Note that an object to be processed of the image processing device 1 in the first embodiment is a frame image that configures a through image.

The object detection unit 1011 detects an object from an image to be processed. An example of the object includes a face of a person, for example. Note that a thing detected by the object detection unit 1011 does not necessarily need to be a face of a person, and may be an animal, a building, or the like, as long as it can be detected. As a detection method, template matching based on a shape of an object, template matching based on luminance distribution of a face, a method based on a characteristic amount of a flesh-colored portion or a face of a human included in an image, or the like, can be used. Further, detection accuracy may be enhanced by a combination of these techniques.

The focus determination unit 1012 determines whether an object detected in an image is focused. Examples of a factor to focus an object include half press of a shutter by a user, full press of the shutter, auto focus, continuous auto focus (AF), manual focus, and the like. A determination result by the focus determination unit 1012 is supplied to the attention area determination unit 11.

The attention area determination unit 11 determines an area to be paid attention (hereinafter, called attention area) in an image to be processed. The attention area is an area in which a thing that is considered as a principal object in the image by a user, who captures the image, such as a person, an animal, a plant, and a building, exists.

The attention area determination unit 11 determines the attention area based on object information acquired by the object detection unit 1011, for example. Further, the attention area determination unit 11 may determine an object focused by the imaging device 1100 as the attention area. Further, the attention area determination unit may determine the attention area based on an input that specifies an area on a through image from the user (an input to a touch panel, various buttons, or the like included in the imaging device 1100). Further, the attention area determination unit may determine an object closer to a center in an image as the attention area. Further, the attention area determination unit may determine an object having a predetermined size or more in an image as the attention area.

Figure 3:
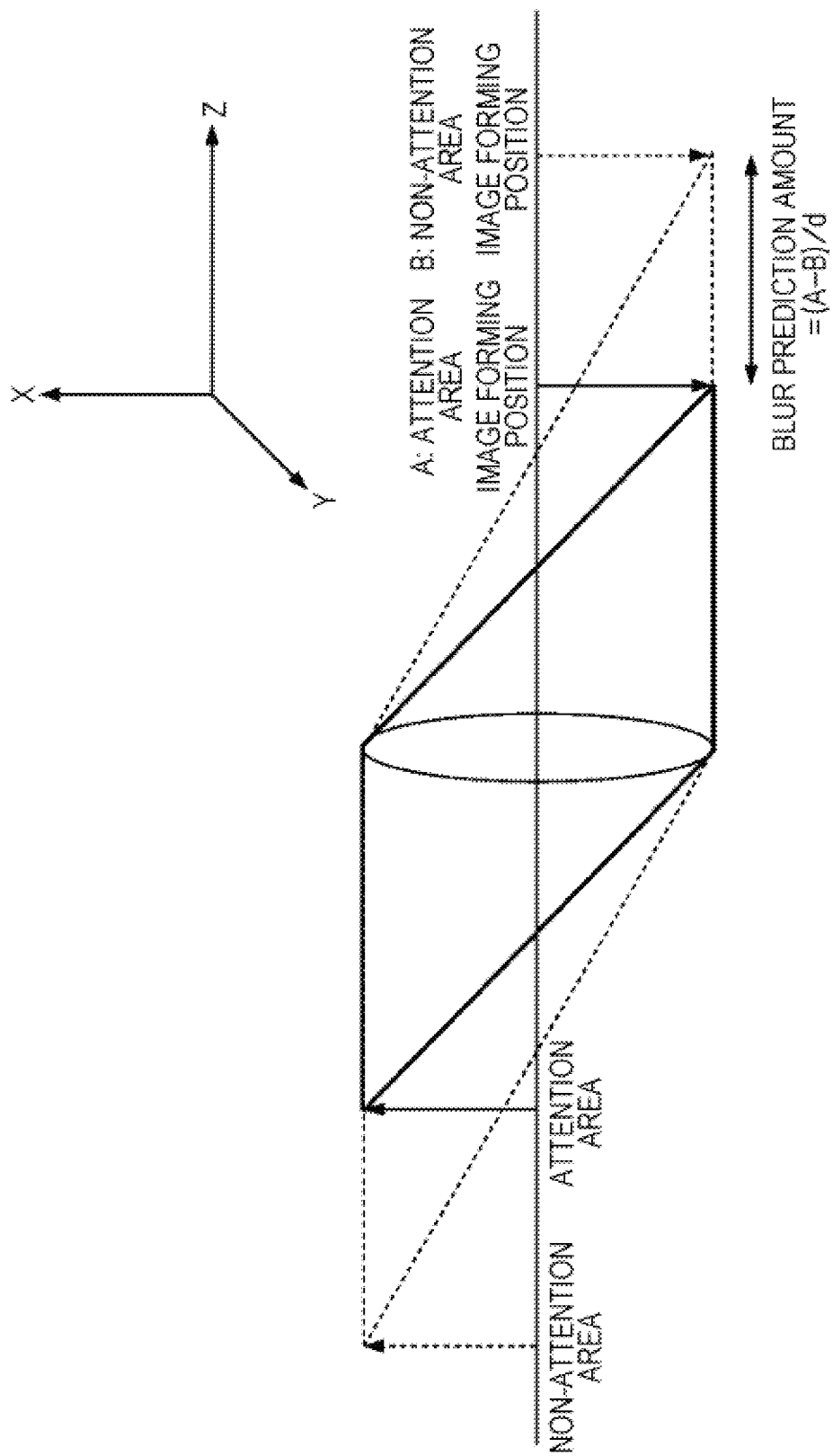
FIG. 3 is a diagram for describing a method of calculating a blur prediction amount.

Information that indicates the attention area in an image determined by the attention area determination unit 11 is supplied to the blur information acquisition unit 12. The blur information acquisition unit 12 acquires blur information in an area outside the attention area (hereinafter, called non-attention area) in the image. The blur information includes a blur amount and a blur prediction amount. The blur amount can be acquired based on a depth of field or phase difference range-finding information in a state where the attention area is focused in the imaging device 1100. The degree of blur is larger as the value of the blur amount is larger. The blur prediction amount indicates to what extent the non-attention area is blurred on the assumption that the attention area is focused. Here, the blur prediction amount as the blur information will be described with reference to FIG. 3. The blur prediction amount can be expressed by the following expression (1):

Blur prediction amount=(A−B)/d ... (1) where an image forming position of the attention area is A, an image forming position of the non-attention area is B, and a focal depth is d.

In this expression (1), only the defocus amount (A−B) of the attention area and the background area may just be obtained. Therefore, it is not necessary to actually form an image on the attention area, and the defocus amount can be obtained from various AF systems, such as a contrast detection system and a phase difference system, and an AF sensor, and the like. The degree of blur in an image may become larger as the value of the blur prediction amount is larger.

Note that the attention area and the non-attention area are not necessarily areas having a uniform distance, and for example, these areas may be obtained and treated such that the areas are classified and treated for each given defocus amount, the areas may be averaged and treated for each vicinity area on an XY plane, or the widest and the same distance areas may be treated as representative values.

Further, the focal depth is determined based on a permissible circle of confusion δ, and δ differs according to an appreciation size. Therefore, a reference may be determined by a method of selecting the reference by the user in advance (according to A3/A4/L size printing, what inch equivalent of the screen size, or the like), or a method of automatically selecting the reference according to the number of recording pixels of an image. Further, when trimming is performed, the focal depth can be treated in an appropriate unit by multiplying a coefficient according to a trimming amount. The blur information acquired by the blur information acquisition unit 12 is supplied to the blur related processing unit 13. The blur related processing unit 13 performs various types of processing according to the blur information. In the first embodiment, the blur related processing unit 13 functions as the graph creation unit 14 and the display control unit 15. The blur related processing unit 13 presents the blur information to the user by displaying a graph that indicates the blur information in the display unit 1007 included in the imaging device 1100.

The graph creation unit 14 creates a graph that indicates the blur information based on the blur information supplied from the blur information acquisition unit 12. The display control unit 15 performs display control of superimposing and displaying the graph generated by the graph creation unit 14 on the image in the display unit 1007 of the imaging device 1100.

Figure 4A:
FIGS. 4A and 4B are diagrams illustrating display forms in the first embodiment.
Figure 4B:
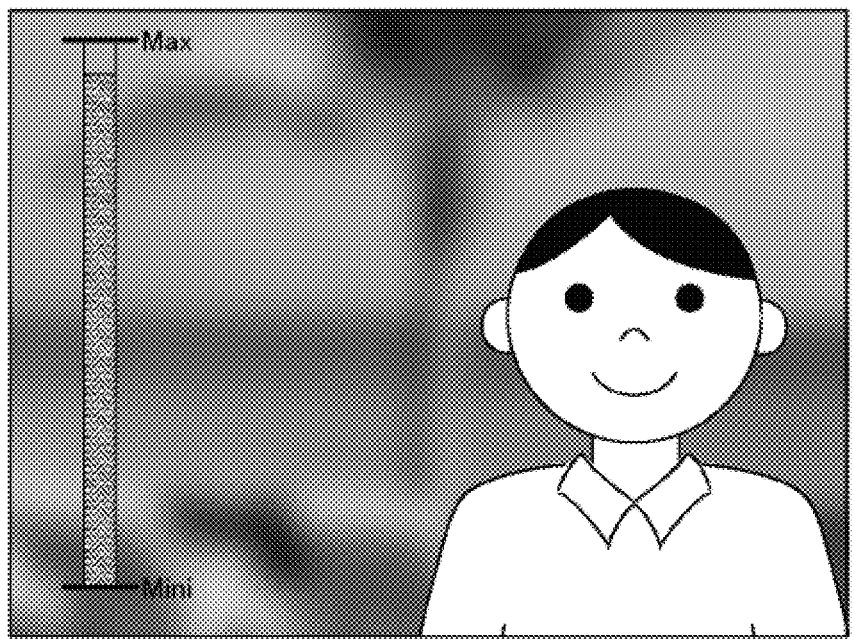

FIGS. 4A and 4B are first examples of forms of the graph generated by the graph creation unit 14 and displayed in the display unit 1007. In these examples, the blur amount as the blur information is presented with a bar graph superimposed and displayed on the through image displayed in the display unit 1007.

The blur amount and the height of the bar graph correspond to each other, and the bar graph becomes higher when the blur amount is large, and the bar graph becomes shorter when the blur amount is small. Further, a color of the bar graph may be changed according to the height of the bar graph so that the graph can be easily recognized by the user. Note that the presentation of the blur amount is not limited to the bar graph, and may be a pie graph.

In the example of FIG. 4A, the person is the attention area, and the background is the non-attention area. The non-attention area is not much blurred. Therefore, the blur amount is small, and the bar graph displayed on the left on the screen is short.

Meanwhile, in the example of FIG. 4B, the person is the attention area, and the background other than the person is the non-attention area. The non-attention area is blurred. Therefore, the blur amount is large, and the bar graph is high.

The blur information is visually presented in this way, whereby the user can accurately recognize to what extent the non-attention area is blurred at present. Note that it is favorable that the blur information acquisition unit 12 continuously acquire the blur amount during image capturing, and the blur related processing unit changes the graph display of the blur amount in real time based on the blur mount acquired by the blur information acquisition unit 12 on a steady basis.

Figure 5:
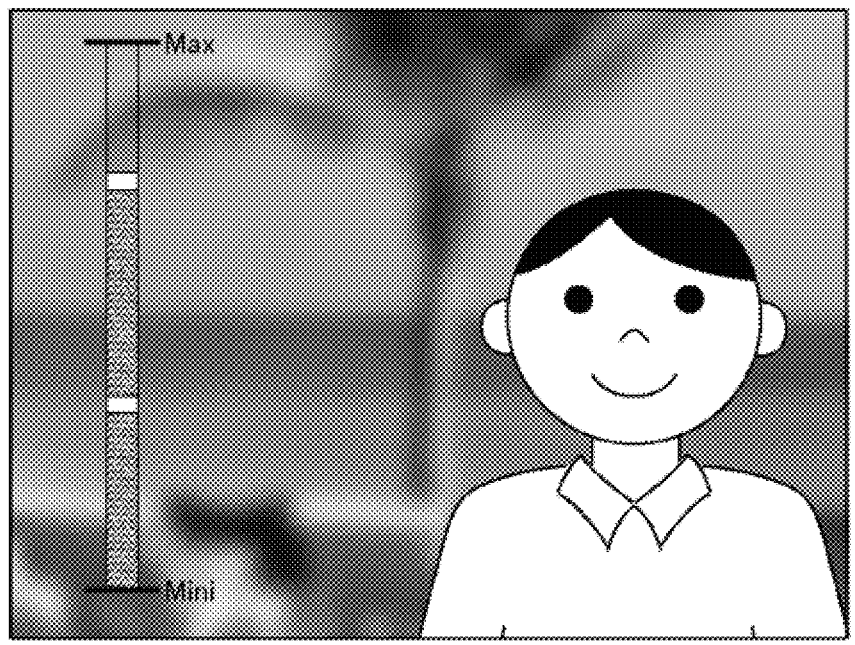
FIG. 5 is a diagram illustrating a display form in the first embodiment.

FIG. 5 is a diagram illustrating a second example of graph display of the blur amount. In FIG. 5, a graph is displayed based on the blur prediction amount instead of the blur amount. In the bar graph of FIG. 5, the height of the bar graph indicates a range of the blur amount that can be realized by a present attention area, a focal distance, and a maximum aperture of a lens. Further, with the mark superimposed and displayed in a bar graph manner, a blur prediction amount in the present F-number is indicated.

Figure 6:
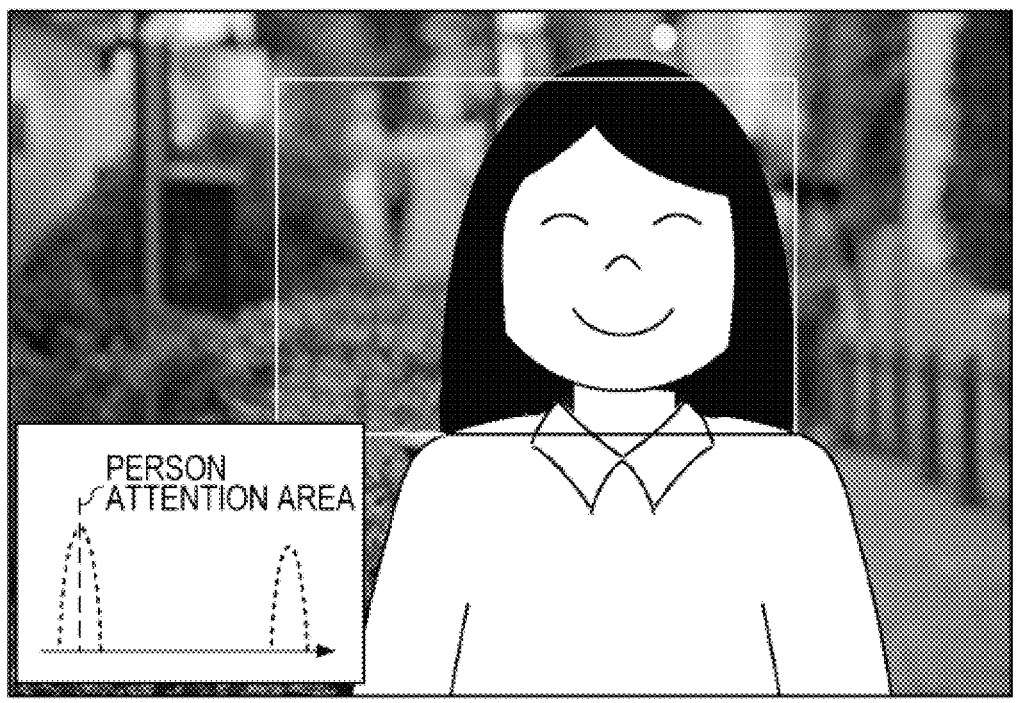
FIG. 6 is a diagram illustrating a display form in the first embodiment.

FIG. 6 is a third embodiment of a graph generated by the graph creation unit 14, and displayed in the display unit 1007. In the third embodiment, the graph creation unit 14 creates a histogram of the blur prediction amount supplied form the blur information acquisition unit 12.

In the histogram, the horizontal axis represents the magnitude of the blur amount or the blur prediction amount. The blur amount or the blur prediction amount becomes larger from the left to the right. Further, the vertical axis of the histogram represents an area ratio of a blurred area and a non-blurred area in an image. By presenting the blur information with a histogram, more detailed information can be presented to the user. The image processing device 1 and the imaging device 1100 having a function of the image processing device 1 according to the first embodiment are configured as described above.

[1-2. Processing in an Image Processing Device and an Imaging Device]

Figure 7:
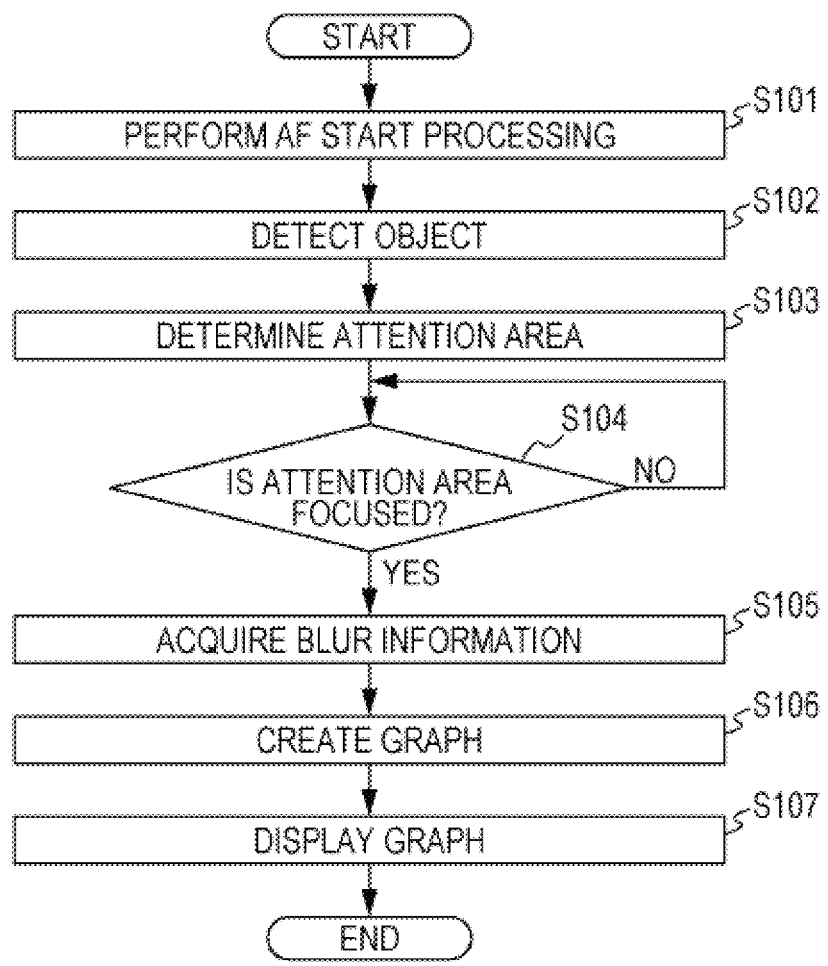
FIG. 7 is a flowchart illustrating a flow of processing in the first embodiment.

Next, a flow of processing performed in the image processing device 1 and the imaging device 1100 will be described with reference to FIG. 7. FIG. 7 is a flowchart illustrating a flow of processing. Assume that image data to be processed has been supplied to the control unit 1010 and the image processing device 1, and the focal distance and the F-number have been acquired. First in step S101, AF start processing is performed in the imaging device 1100. The AF start processing is executed by various methods, such as a half press operation of a shutter, which is one of the input unit 1008, a touch operation to the touch panel, and automatic start by detection of object change. Further, regarding a phase difference sensor, and the like, which can acquire distance information on a steady basis, an AF function may be operated on a steady basis without a specific input operation from the user. When the AF start processing is performed, a predetermined control signal is supplied to the image processing device 1, and processing by the control unit 1010 and the image processing device 1 is started.

Next in step S102, an object in an image is detected by the object detection unit 1011. Next, in step S103, an attention area and a non-attention area in the image are determined by the attention area determination unit 11. As described above, the attention area is a person, for example, and the non-attention area is an area other than the person as the attention area, such as a background. Next, in step S104, whether the attention area is focused is determined by the focus determination unit 1012. A determination result by the focus determination unit 1012 is supplied to the blur information acquisition unit 12. Next, in step S105, a blur amount or a blur prediction amount in the image is acquired by the blur information acquisition unit 12. Next, in step S106, a graph indicating the blur information is generated by the graph creation unit 14. Then, in step S106, the graph is superimposed and displayed on a through image in the display unit 1007 by the display control unit 15. The first embodiment of the present technology is configured as described above. According to the first embodiment, the degree of blur of an image to be acquired by image capturing can be presented to the user in various forms in an easy-to-understand manner. Accordingly, even in a case where the degree of blur of an image in a through image is hard to understand because the size of the display unit 1007 of the imaging device 1100 is small, the user can easily recognize the degree of blur.

2. Second Embodiment

[2-1. Configurations of an Image Processing Device and an Imaging Device Including the Image Processing Device]

Figure 8:
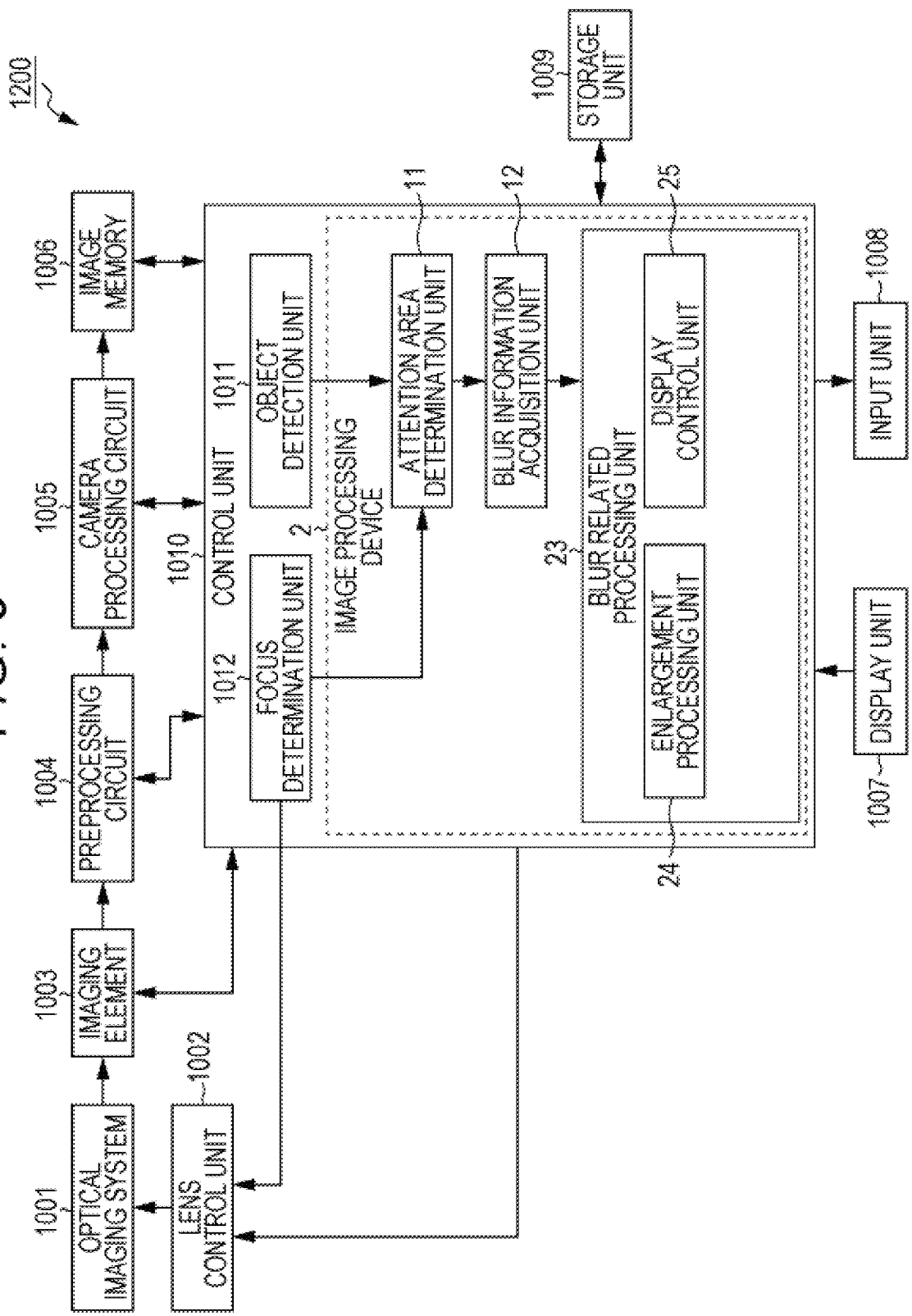
FIG. 8 is a block diagram illustrating a configuration of an imaging device provided with a function of an image processing device according to a second embodiment.

Next, a second embodiment of the present technology will be described. In the second embodiment, an image processing device 2 is also operated in an imaging device 1200. FIG. 8 is a block diagram illustrating a configuration of the imaging device 1200 provided with the image processing device 2 according to the second embodiment.

The image processing device 2 according to the second embodiment is different from the first embodiment in that a blur related processing unit 23 functions as an enlargement processing unit 24 and a display control unit 25. Configurations other than the above are similar to those in the first embodiment, and thus description is omitted.

An object to be processed of the image processing device 2 in the second embodiment is a frame image that configures a through image. The second embodiment presents the degree of blur of an image to the user in an easy-to-understand manner by enlarging a part of the image.

Figure 9A:
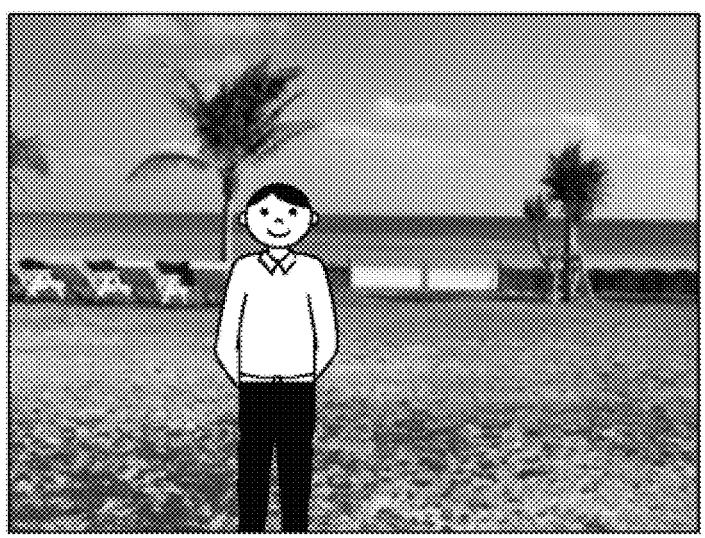
FIGS. 9A to 9C are diagrams illustrating display forms in the second embodiment.
Figure 9B:
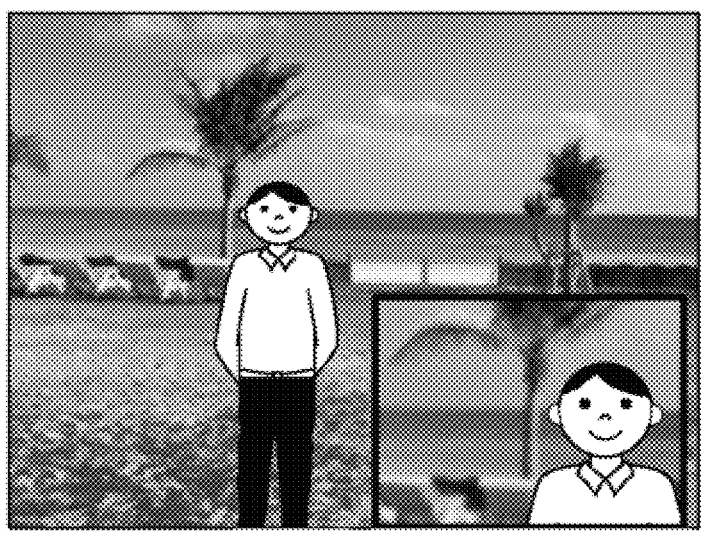

The enlargement processing unit 24 generates an image in which a range including both of an attention area and a non-attention area in the image is enlarged. For example, when a through image is in a state illustrated in FIG. 9A, a range in which both of the attention area and the non-attention area are included is enlarged as illustrated in FIG. 9B. An enlargement range is favorably to set such that ratios of the attention area and the non-attention area become nearly equal in the enlargement range so that a difference of the degree of blur between the attention area and the non-attention area. However, a method of setting the enlargement range is not limited to the above example.

Figure 9C:
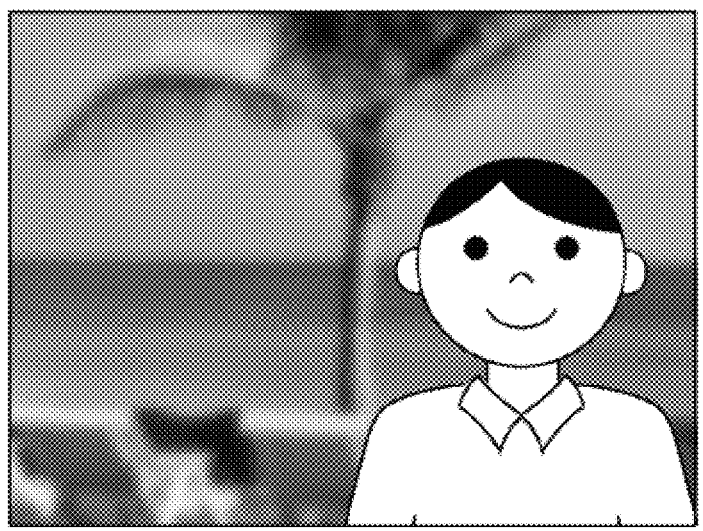

The display control unit 25 superimposes and displays the image enlarged by an enlargement processing unit on the through image, as illustrated in FIG. 9B. Further, a segmented enlarged image may be fully displayed in a display unit 1007, as illustrated in FIG. 9C. Further, as illustrated in FIG. 9B, the enlarged image is superimposed and displayed on the through image, and when there is an input to the enlarged image (a contact of a finger to the touch panel), the enlarged image may be fully displayed in the display unit 1007, as illustrated in FIG. 9C.

Note that this enlargement display is favorably displayed for a given time after completion of an AF operation of the imaging device 1200. Note that the blur related processing unit 23 determines whether a blur prediction amount obtained by a blur information acquisition unit 12 is a predetermined amount or more. When the blur prediction amount is the predetermined amount or more, the blur related processing unit 23 causes the enlargement processing unit 24 and the display control unit 25 to execute the above enlargement display processing.

[2-2. Processing in an Image Processing Device and an Imaging Device]

Figure 10:
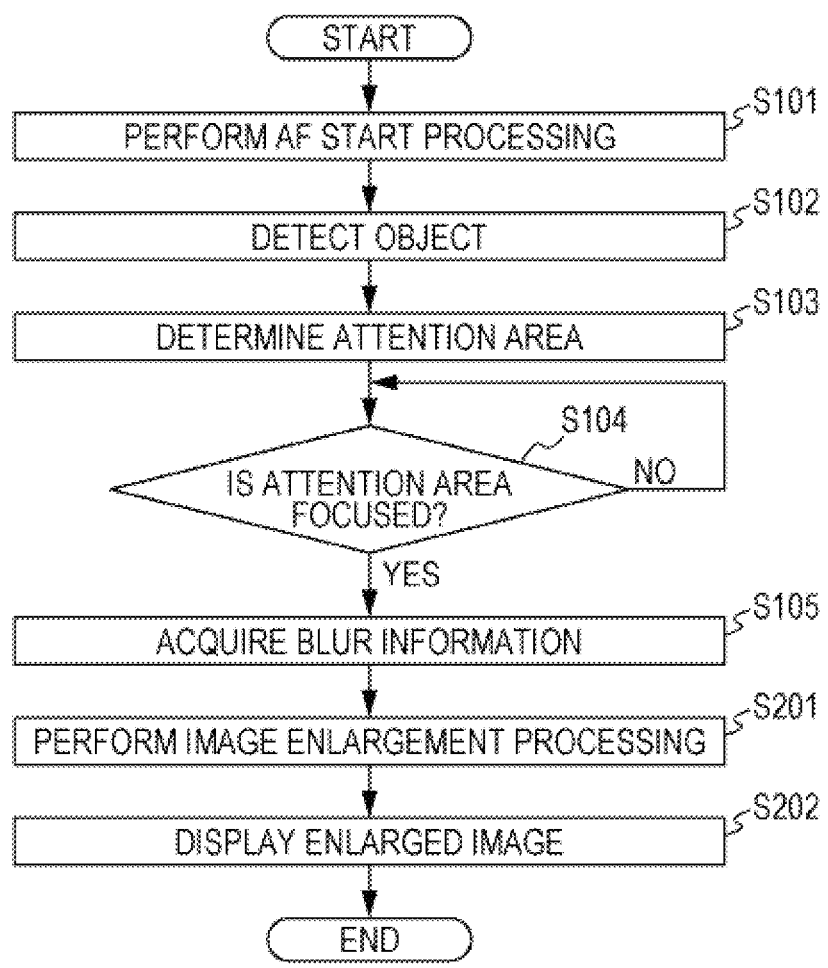
FIG. 10 is a flowchart illustrating a flow of processing in the second embodiment.

Next, a flow of processing performed in the image processing device 2 and the imaging device 1200 will be described with reference to FIG. 10. FIG. 10 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S201, image enlargement processing is performed by the enlargement processing unit 24. Then, in step S202, an enlarged image is superimposed and displayed on a through image by the display control unit 25.

The second embodiment of the present technology is configured as described above. The second embodiment enlarges and displays a part of an image such that both of the attention area and the non-attention area in the image are included, whereby the user can more accurately recognize the degree of blur.

3. Third Embodiment

[3-1. Configurations of an Image Processing Device and an Imaging Device Including the Image Processing Device]

Next, a third embodiment of the present technology will be described. In the third embodiment, an image processing device 3 is also operated in an imaging device 1300. FIG. 11 is a block diagram illustrating a configuration of the imaging device 1300 provided with a function of the image processing device 3 according to the third embodiment.

The image processing device 3 according to the third embodiment is different from the first embodiment in that a blur related processing unit 33 functions as a blur amount adjustment unit 34 and a display control unit 35.

Configurations other than the above are similar to those in the first embodiment, and thus description is omitted. An object to be processed of the image processing device 3 in the third embodiment is a frame image that configures a through image. In the third embodiment, a blur amount adjustment function by the blur amount adjustment unit 34 is automatically started, and a blur adjustment user interface is further automatically displayed.

The blur amount adjustment unit 34 adjusts a diaphragm of a lens and changes a blur amount of a non-attention area by transmitting a predetermined control signal to a lens control unit 1002 of the imaging device 1300 according to an input to an input unit 1008 from the user.

When the blur amount of an image is adjusted by the blur amount adjustment unit 34 according to an input from the user, a blur adjustment user interface is displayed in a display unit 1007 by the display control unit 35 so that the user can easily perform an input.

When a focal distance and an F-number are obtained, and an adjustable range of a blur prediction amount is a predetermined amount or more by changing the F-number, the blur related processing unit automatically starts a blur amount adjustment function by the blur amount adjustment unit. The display control unit 35 then displays the blur amount adjustment user interface in the display unit 1007.

Figure 12A:
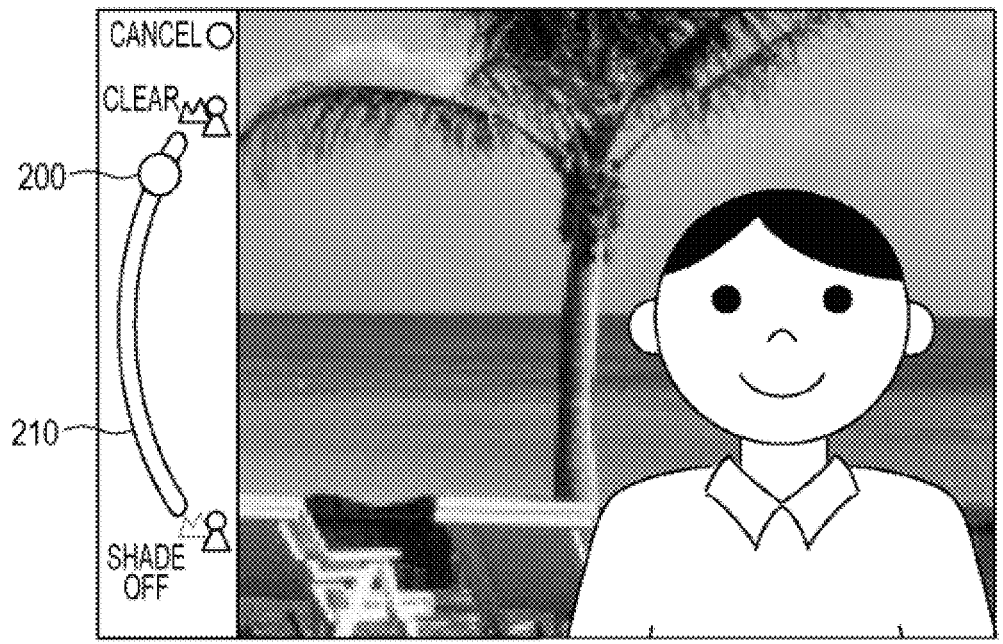
FIGS. 12A and 12B are diagrams illustrating display forms in the third embodiment.
Figure 12B:
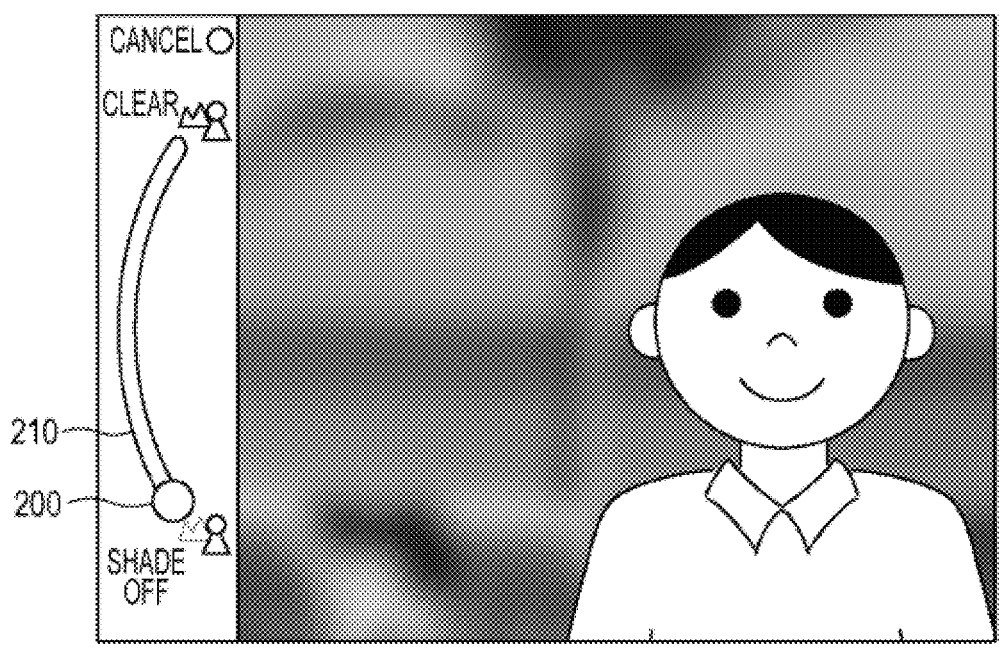

FIGS. 12A and 12B are diagrams illustrating states in which the user interface of the blur amount adjustment function is displayed in the display unit 1007. In the examples of FIGS. 12A and 12B, a pointer 200 movable in a vertical direction by an operation of the user is displayed. A position of the pointer 200 is moved in conjunction with the blur amount of an image.

The blur amount of an image is changed according to the position of the pointer 200. At an upper end of a bar 210 that indicates a moving path of the pointer 200, an icon is displayed together with characters of "clear" to capture the non-attention area clearly without shading off the area. Further, at a lower end of the bar 210 that is the moving path of the pointer 200, an icon is displayed together with characters of "shade off" to blur and capture the non-attention area. When the user moves the pointer 200 upward, the diaphragm becomes smaller, and the non-attention area becomes clear with a less blur amount. Meanwhile, when the user moves the pointer 200 downward, the diaphragm becomes larger, and the non-attention area is blurred with a large blur amount. In FIG. 12A, the pointer 200 is positioned at the upward clear side, and thus the image is not much blurred. Meanwhile, in FIG. 12B, the pointer 200 is positioned at the downward shading-off side, and thus the blur amount of the image is large.

Figure 13A:
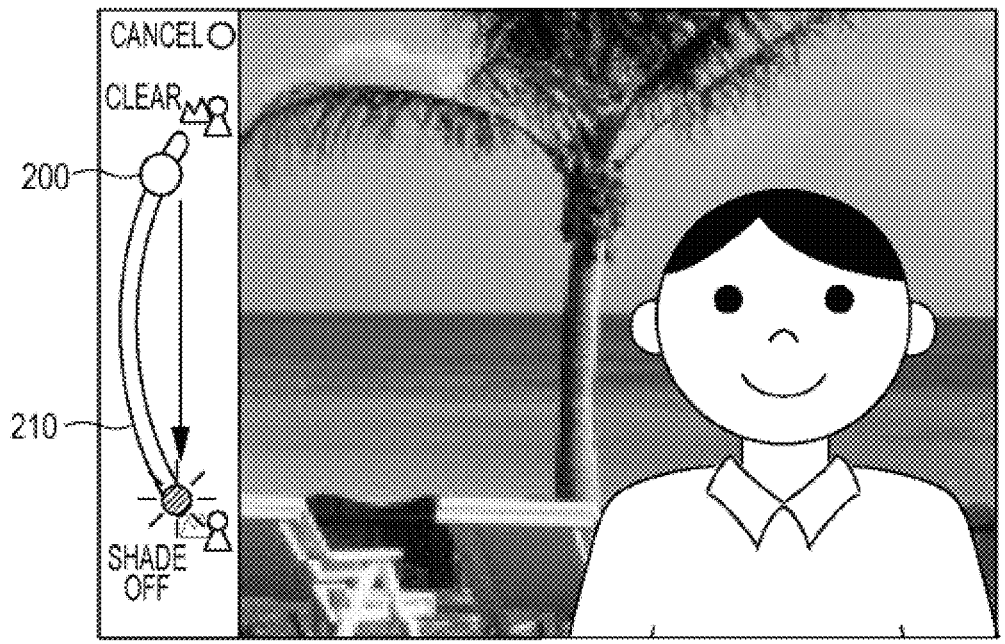
FIGS. 13A and 13B are diagrams illustrating display forms in the third embodiment.

Note that, as illustrated in FIG. 13A, a position that indicates a recommended blur amount is displayed, and display of an arrow, blinking of the position, display of animation, and the like may be performed in order to induce the user to move the pointer 200 to the position. This enables the user who does not understand a blur control function to easily blur an image.

Figure 13B:
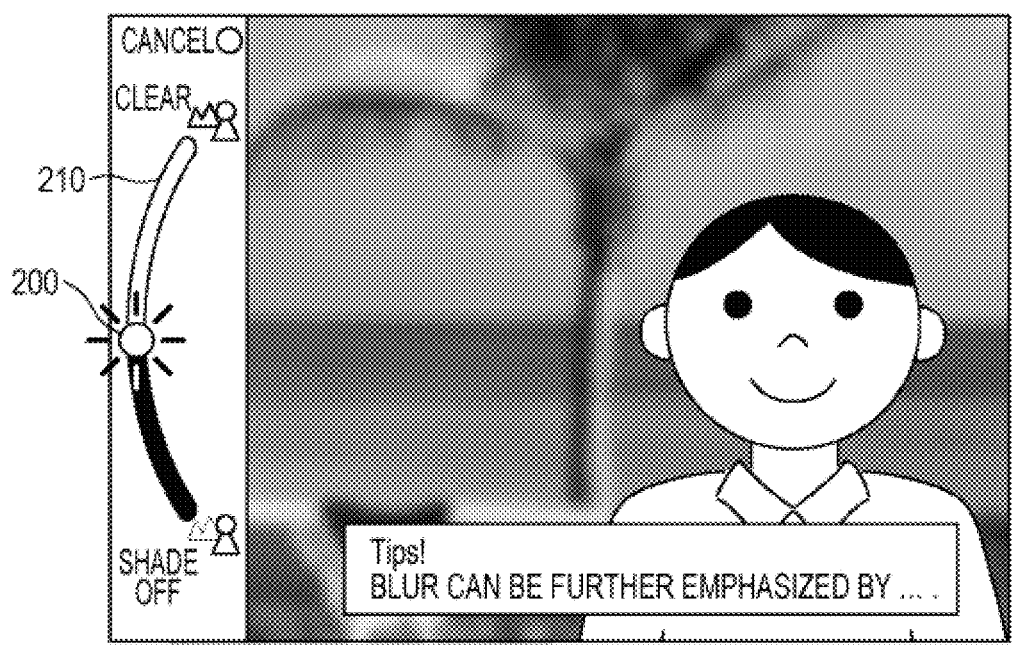

Further, as illustrated in FIG. 13B, an area other than the adjustable range by the blur control is filled, and when the present degree of adjustment by the blur control has reached a limit, the pointer 200 may be blinked for a given time, and tips may be displayed. In the example of FIG. 13B, a tip to emphasize the degree of blur of an image is displayed.

Note that the form of the user interface of the blur control function is not limited to the one illustrated in FIGS. 12A and 12B, and 13A and 13B. Any interface may be employed as long as the interface can adjust a blur amount of an image.

[3-2. Processing in an Image Processing Device and an Imaging Device]

Figure 14:
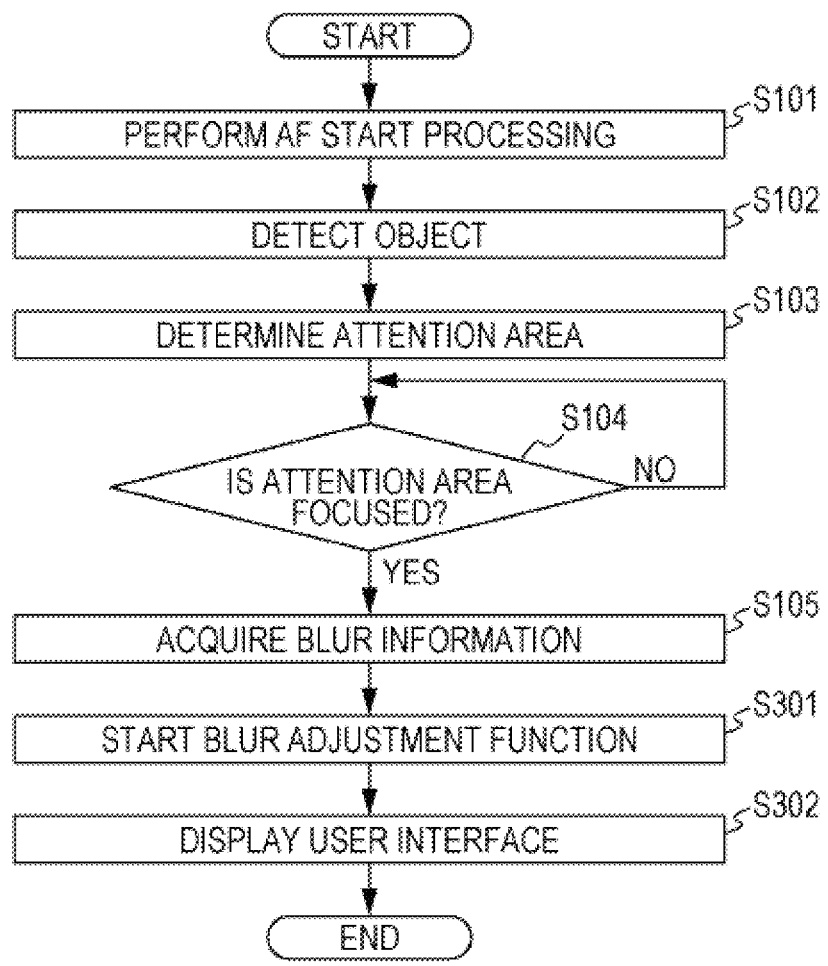
FIG. 14 is a flowchart illustrating a flow of processing in the third embodiment.

Next, a flow of processing performed in the image processing device 3 and the imaging device 1300 will be described with reference to FIG. 14. FIG. 14 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S301, the blur related processing unit 33 causes the blur amount adjustment function by the blur amount adjustment unit 34 to automatically start. Note that, as described above, the blur amount adjustment function is favorably automatically started when the adjustable range of the blur prediction amount is a predetermined amount or more by changing the F-number. Next, in step S302, the display control unit 35 then displays the blur amount adjustment user interface in the display unit 1007. The third embodiment of the present technology is configured as described above. According to the third embodiment, the blur amount adjustment function is automatically started, whereby the user can easily perform adjustment of the degree of blur. Further, a user who does not know the existence of the blur amount adjustment function or a user who knows the blur amount adjustment function but has a low frequency of use can be urged to use the blur amount adjustment function.

4. Fourth Embodiment

[4-1. Configurations of an Image Processing Device and an Imaging Device Including the Image Processing Device]

Next, a fourth embodiment of the present technology will be described. In the fourth embodiment, an image processing device 4 is also operated in an imaging device 1400. FIG. 15 is a block diagram illustrating a configuration of the imaging device 1400 provided with a function of the image processing device 4 according to the fourth embodiment.

The fourth embodiment is different from the first embodiment in that a blur related processing unit 43 functions as an image processing unit 44, a display control unit 45, and a blur amount adjustment unit 46.

Configurations other than the above are similar to those in the first embodiment, and thus description is omitted. An object to be processed of the image processing device 4 in the fourth embodiment is a frame image that configures a through image. The fourth embodiment presents what a blurred image is like to the user by displaying the image in which a blur amount has been adjusted in a display unit 1007.

A blur information acquisition unit 12 acquires a blur prediction amount by present setting of the imaging device 1400, and a blur prediction amount in a maximum aperture.

The image processing unit 44 generates an image in which the degree of blur in a state where the F-number is opened is reproduced by applying blur processing to an image. When the blur prediction amount in the present setting is a predetermined amount or less, and the blur prediction amount in the maximum aperture is a predetermined amount or more, the image processing unit 44 generates an image in which the degree of blur in a state where the F-number is opened is reproduced. The blur amount adjustment unit 46 is similar to the blur amount adjustment unit in the third embodiment.

Figure 16A:
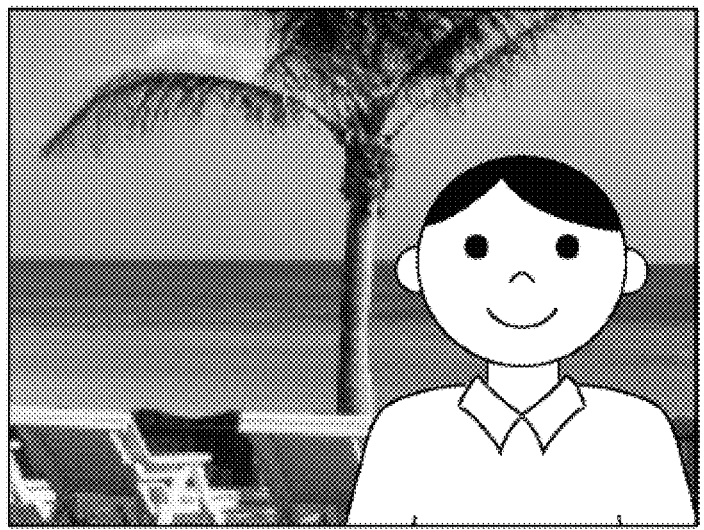
FIGS. 16A to 16C are diagrams illustrating display forms in the fourth embodiment.
Figure 16B:
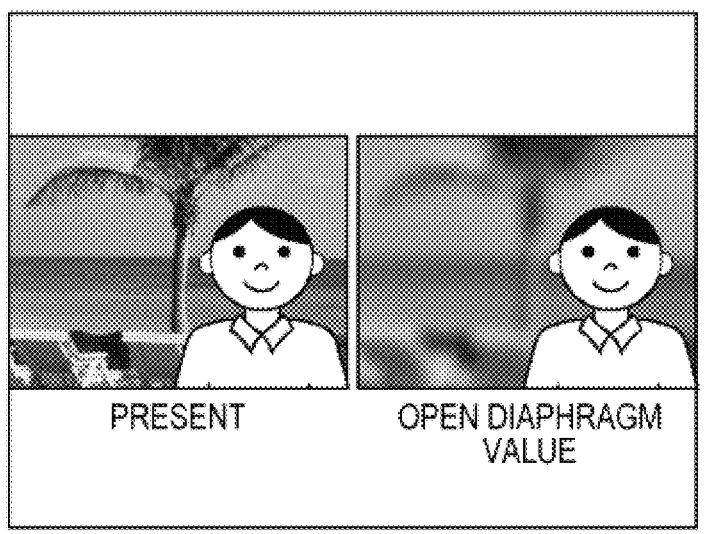

The display control unit 45 makes transition of display of a through image in the display unit 1007 from the state of FIG. 16A to the state of FIG. 16B. In the state of FIG. 16B, an image acquired in the present setting of the imaging device 1400 and an image to which image processing has been applied into a state in which the F-number is opened by the image processing unit 44 are displayed side by side. In FIG. 16B, The left-side image is the present image and the right-side image is the image to which image processing has been applied into a state in which the F-umber is opened. Accordingly, the user can easily compare the present image (through image) and the image in which the degree of blur is emphasized. Note that the display form of the images is not limited to the one illustrated in FIG. 16B, and the images may be arranged in the vertical direction. Further, the present image and a plurality of images to which processing has been applied by the image processing unit 44 may be displayed so that a difference occurs in the degree of blur.

Figure 16C:
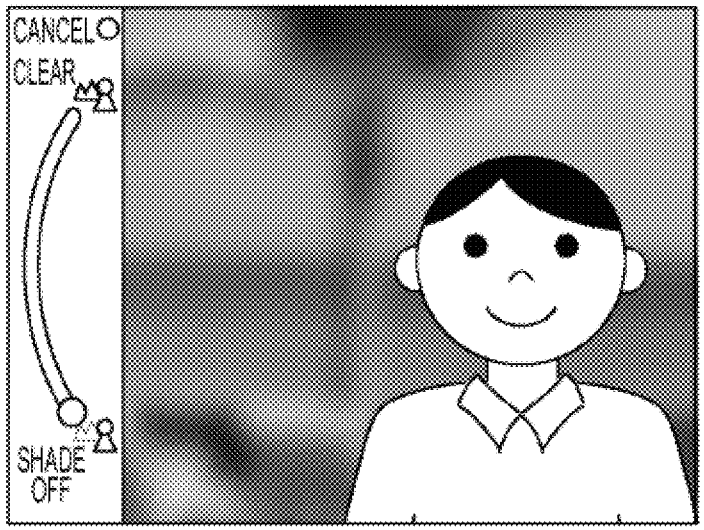

Then, when any of the images is selected by the user, the display control unit 45 fully displays the selected image in the display unit 1007, as illustrated in FIG. 16C. As a method of selecting an image, there are a method by selection with an operation key and a method in which a finger is brought into contact with any of the images in a case where the input unit 1008 is a touch panel. When the selected image is fully displayed in the display unit 1007, the display control unit 45 may display the blur amount adjustment function user interface by the blur amount adjustment unit 46 in the display unit 1007. This enables the user to acquire an easily selected image by image capturing. Further, the blur amount adjustment function is automatically started, whereby the user can adjust the blur amount such that the image further suits to own taste from the state of the selected image. Note that, in the state where a plurality of images is displayed, as illustrate in FIG. 16B, when any of the images is selected by the user, the image may be acquired by automatic image capturing. This enables even a user who does not know the operation of the blur control to capture a blurred image.

[4-2. Processing in an Image Processing Device and an Imaging Device]

Figure 17:
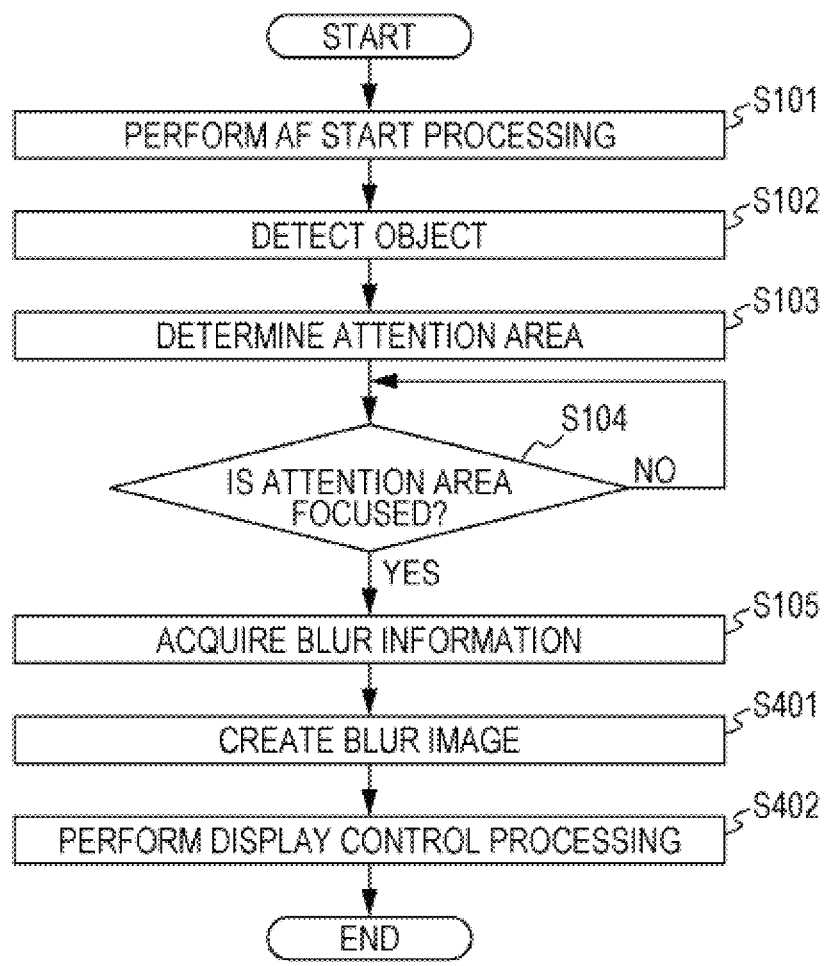
FIG. 17 is a flowchart illustrating a flow of processing in the fourth embodiment.

Next, a flow of processing performed in the image processing device 4 and the imaging device 1400 will be described with reference to FIG. 17. FIG. 17 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S401, an image to which image processing has been applied into a state in which the F-number is opened is generated by the image processing unit 44.

Then, in step S402, an image acquired in the present setting of the imaging device 1400, and an image to which processing has been applied into a state in which the F-number is opened by the image processing unit 44 are displayed in the display unit 1007 by the display control unit 45.

The fourth embodiment of the present technology is configured as described above. According to the fourth embodiment, the user can easily compare the present image and the image in which the degree of blur is emphasized.

Accordingly, whether it is better to acquire a blurred image by image capturing, and the like, can be easily determined.

5. Fifth Embodiment

[5-1. Configurations of an Image Processing Device and an Imaging Device Including the Image Processing Device]

Figure 18:
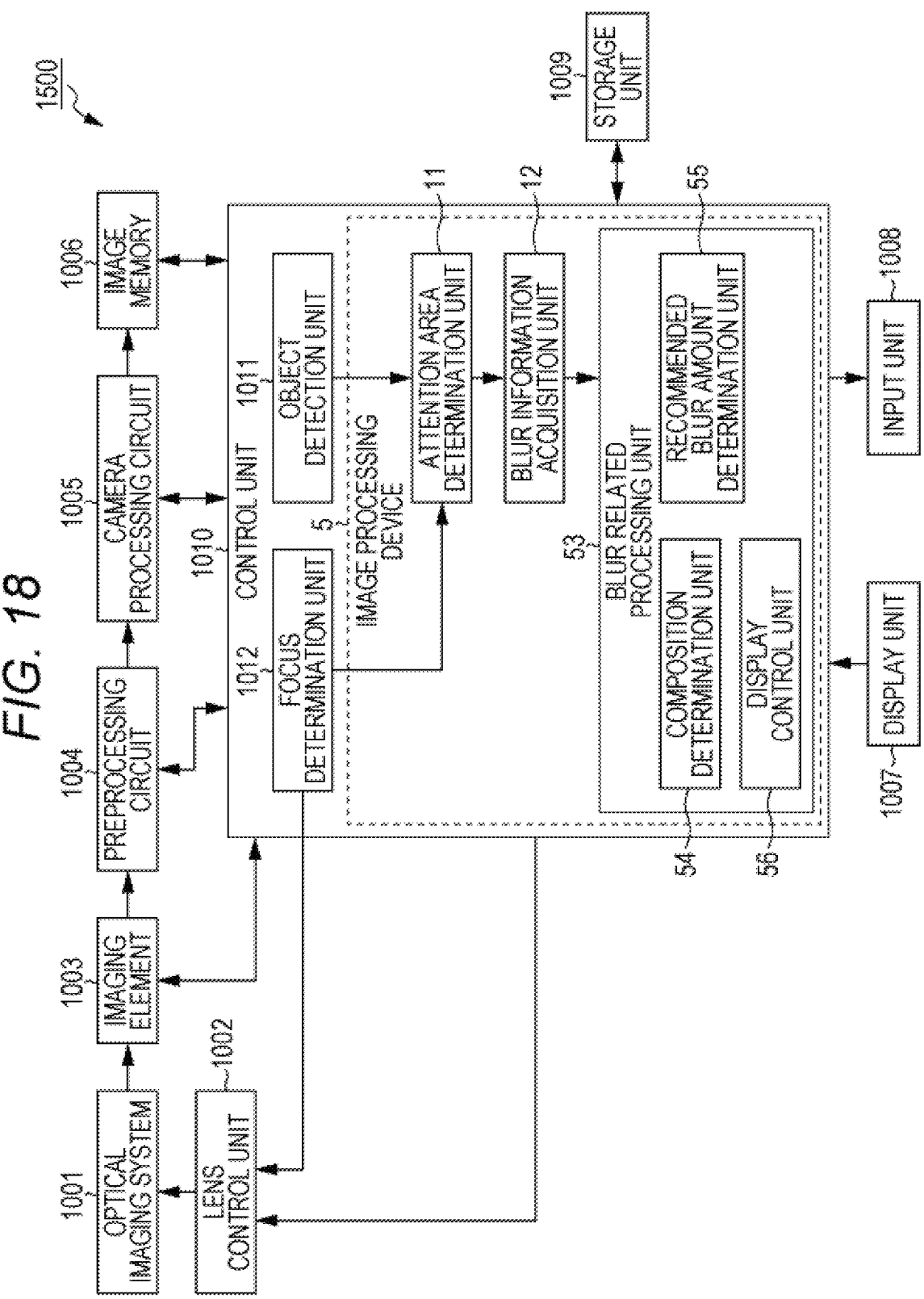
FIG. 18 is a block diagram illustrating a configuration of an imaging device provided with a function of an image processing device according to a fifth embodiment.

Next, a fifth embodiment of the present technology will be described. In the fifth embodiment, an image processing device 5 is also operated in an imaging device 1500. FIG. 18 is a block diagram illustrating a configuration of the imaging device 1500 provided with a function of the image processing device 5 according to the fifth embodiment.

The image processing device 5 according to the fifth embodiment is different from the first embodiment in that a blur related processing unit 53 functions as a composition determination unit 54, a recommended blur amount determination unit 55, and a display control unit 56. Configurations other than the above are similar to those in the first embodiment, and thus description is omitted.

Figure 19A:
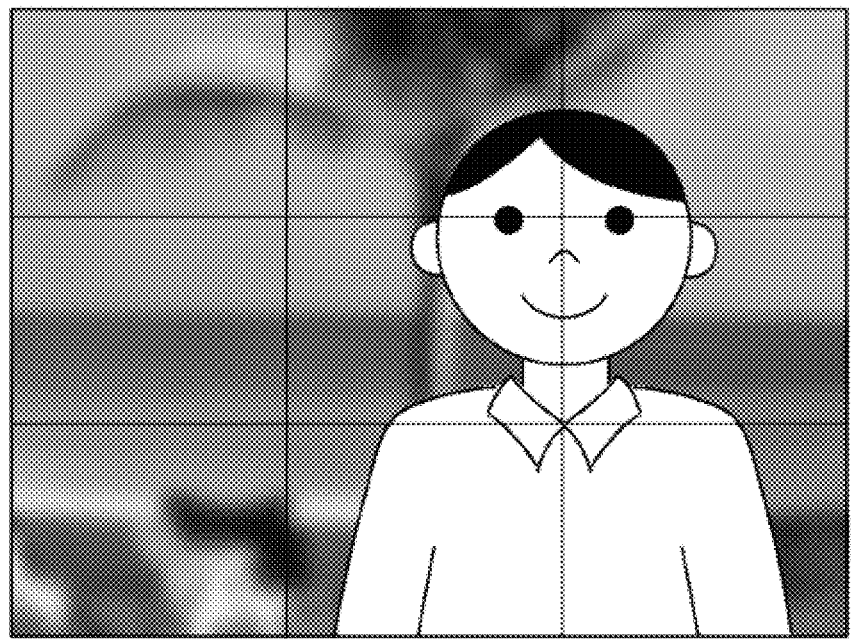
FIGS. 19A and 19B are diagrams illustrating display forms in the fifth embodiment.
Figure 19B:
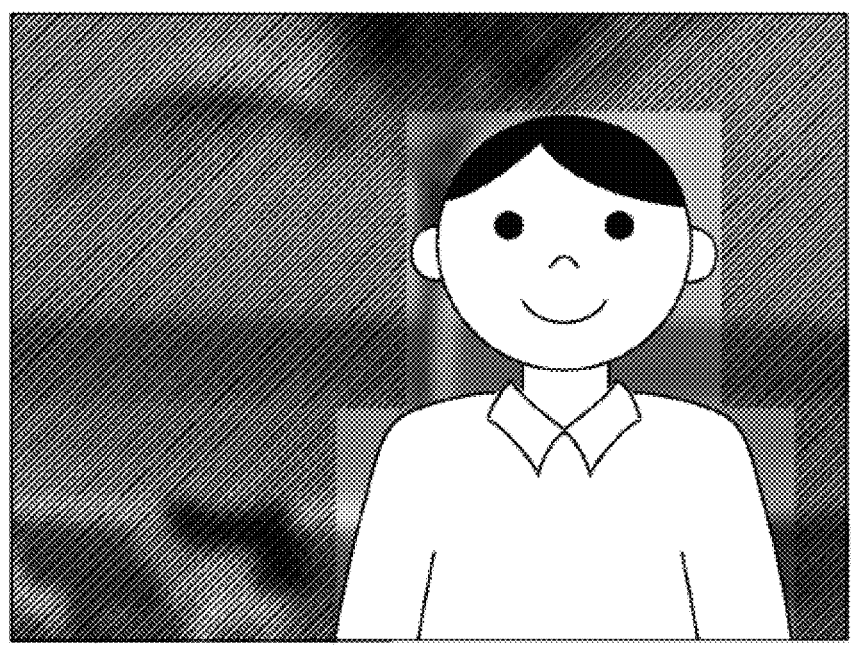

An object to be processed of the image processing device 5 in the fifth embodiment is a frame image that configures a through image. The fifth embodiment determines a composition in an image, and applies mask (zebra) display processing to the image according to a recommended blur amount in the composition. The composition determination unit 54 determines whether the image matches a predetermined composition. The composition determination unit 54 includes a plurality of algorithms for composition determination in advance, and executes the composition determination processing based on the plurality of composition determination algorithms. The composition determination unit 54 determines, for example, whether an image includes a composition, such as a whole body shot, a bust shot, close-up of a face, or the like, based on the position of an object such as a person, the size of the person, the size of the face, or the like. Further, the composition determination unit 54 determines whether the image corresponds to a thirds composition, a fourths composition, a sun flag composition, a diagonal composition, or the like, based on a predetermined composition template. A determination result by the composition determination unit 54 to the recommended blur amount determination unit 55. The recommended blur amount determination unit 55 determines a recommended blur amount corresponding to the composition of the image determined by the composition determination unit 54. This recommended blur amount is a recommended blur amount in the composition corresponding to each composition. The recommended blur amount is obtained by referring to a table in which a composition and a recommended blur amount are associated, for example. For example, as illustrated in FIG. 19A, when it has been determined by the composition determination unit that an image is a thirds composition, the recommended blur amount determination unit 55 determines the recommended blur amount corresponding to the composition. When a difference between the recommended blur amount and the blur prediction amount is within a predetermined range, the display control unit 56 superimposes and displays a mask on the image such that the image becomes to have the recommended blur amount, as illustrated in FIG. 19B. This enables the user to easily recognize the state in which an image has a recommended blur amount.

[5-2. Processing in an Image Processing Device and an Imaging Device]

Figure 20:
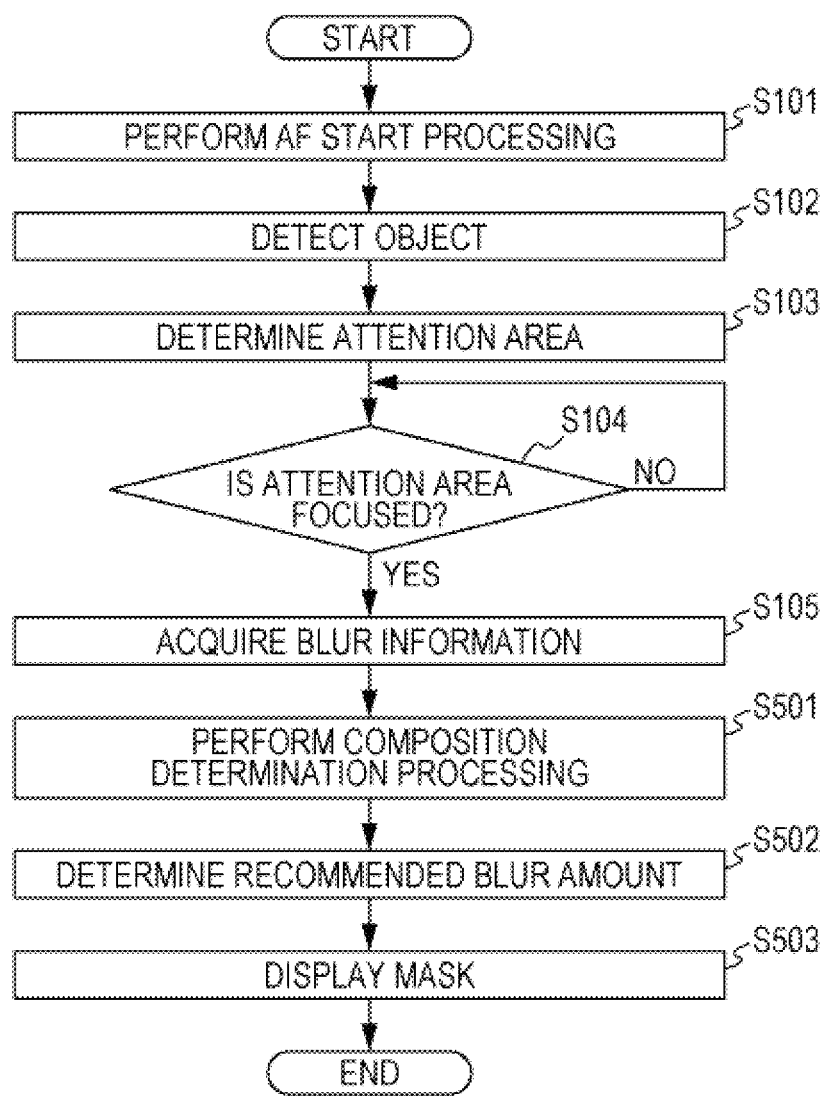
FIG. 20 is a flowchart illustrating a flow of processing in the fifth embodiment.

Next, a flow of processing performed in the image processing device 5 and the imaging device 1500 will be described with reference to FIG. 20. FIG. 20 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S501, a composition of a present image is determined by the composition determination unit 54. Next, in step S502, a recommended blur amount of the determined composition is determined by the recommended blur amount determination unit 55. Then, in step S503, when a difference between the recommended blur amount and the blur prediction amount is within a predetermined range, a mask is superimposed and displayed on the image such that the image becomes to have the recommended blur amount by the display control unit 56.

The fifth embodiment of the present technology is configured as described above. According to the fifth embodiment, a blur amount of an image can be emphasized by mask display, whereby the user can easily recognize what an image having a large blur amount is like.

6. Sixth Embodiment

[6-1. Configurations of an Image Processing Device and an Imaging Device Including the Image Processing Device]

Figure 21:
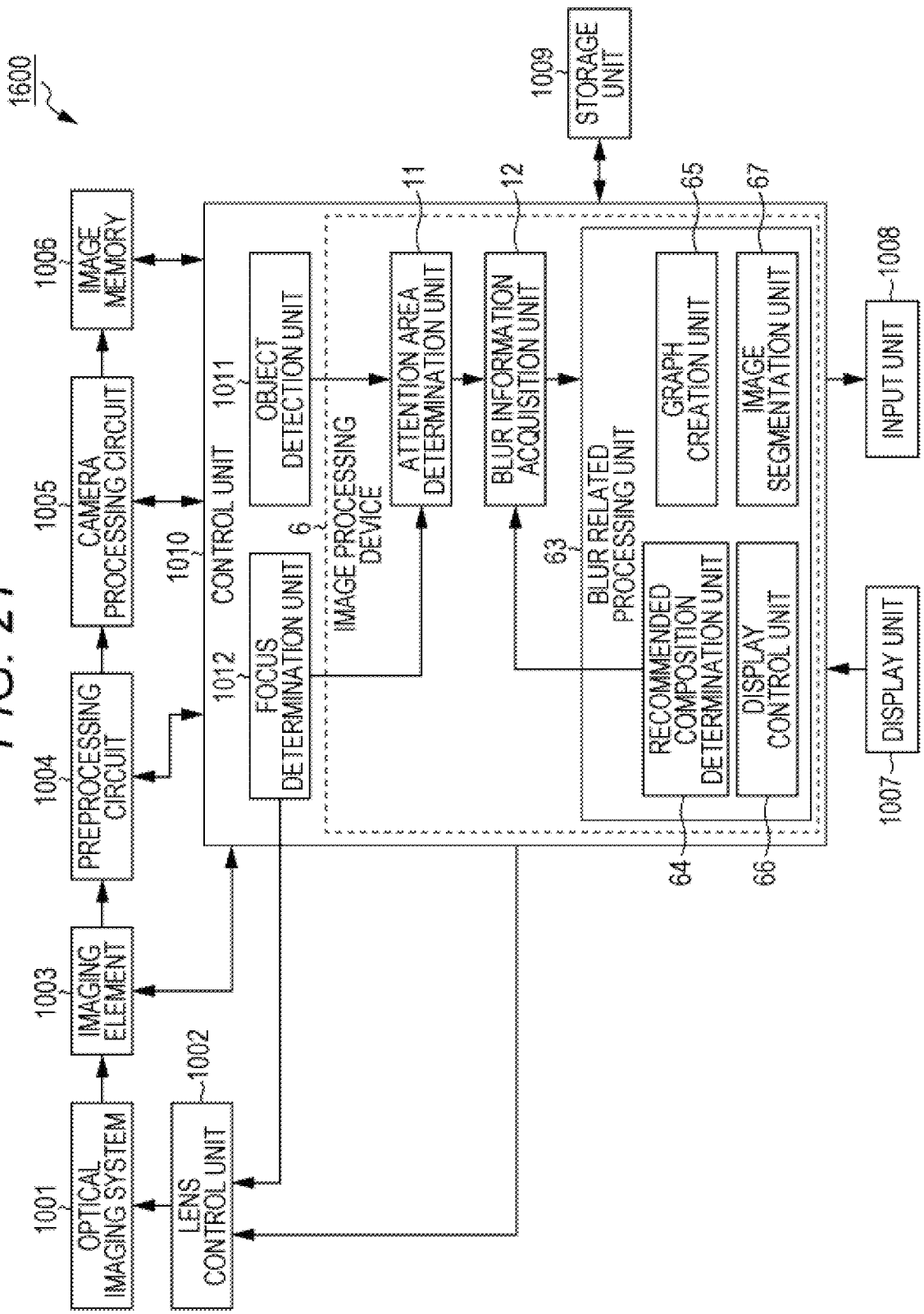
FIG. 21 is a block diagram illustrating a configuration of an imaging device provided with a function of an image processing device according to a sixth embodiment.

Next, a sixth embodiment of the present technology will be described. In the sixth embodiment, an image processing device 6 is also operated in an imaging device 1600. FIG. 21 is a block diagram illustrating a configuration of the imaging device 1600 provided with a function of the image processing device 6 according to the sixth embodiment.

The image processing device 6 according to the sixth embodiment is different from the first embodiment in that a blur related processing unit 63 functions as a recommended composition determination unit 64, a graph creation unit 65, a display control unit 66, and an image segmentation unit 67. Configurations other than the above are similar to those in the first embodiment, and thus description is omitted.

An object to be processed of the image processing device 6 in the sixth embodiment is a frame image that configures a through image. The sixth embodiment presents, to the user, blur information in a recommended composition in the image, with a histogram by the image processing device 6.

The recommended composition determination unit 64 includes a plurality of algorithms for detecting a composition from an image, and executes composition detection processing based on the plurality of composition detection algorithms.

The recommended composition determination unit 64 determines, for example, whether an image includes a composition, such as a whole body shot, a bust shot, close-up of a face, or the like, based on the position of an object such as a person, the size of the person, the size of the face, or the like. Further, the recommended composition determination unit 64 determines whether the image includes a thirds composition, a fourths composition, a sun flag composition, a diagonal composition, or the like, based on a predetermined composition template. The recommended composition determination unit 64 then determines a recommended composition (hereinafter, referred to as recommended composition) based on the position and the size of an object in each composition, and the like.

The blur information acquisition unit 12 acquires a blur prediction amount of the entire image, and calculates a blur prediction amount in a non-attention area in the recommended composition determined by the recommended composition determination unit 64. The calculated blur prediction amount is supplied to the graph creation unit 65.

Figure 22A:
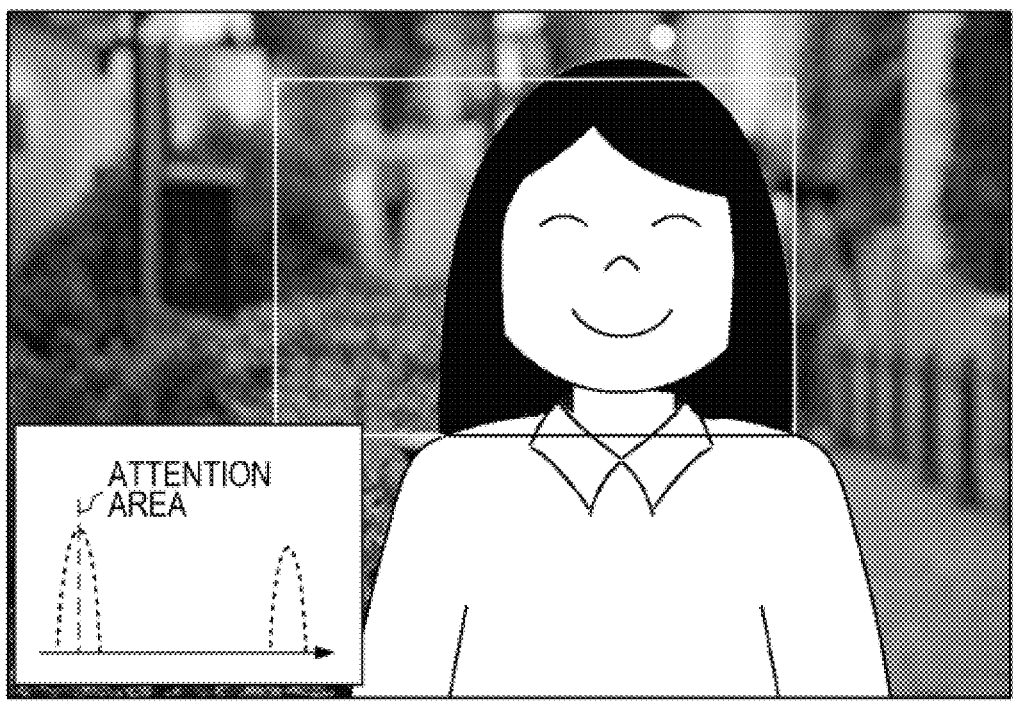
FIGS. 22A and 22B are diagrams illustrating display forms in the sixth embodiment.

The graph creation unit 65 is similar to the graph creation unit of the first embodiment, and creates a histogram indicating the supplied blur information. The display control unit 66 displays the histogram created by the graph creation unit in the display unit. The display control unit 66 superimposes and displays the blur prediction amount on the image as a histogram in a display unit 1007, as illustrated in FIG. 22A, for example. Note that, when the blur prediction amount is displayed by the histogram, a frame indicating the recommended composition is favorably displayed together with the histogram, as illustrated in FIG. 22A. This enables the user to easily recognize the position and the size of the recommended composition.

Figure 22B:
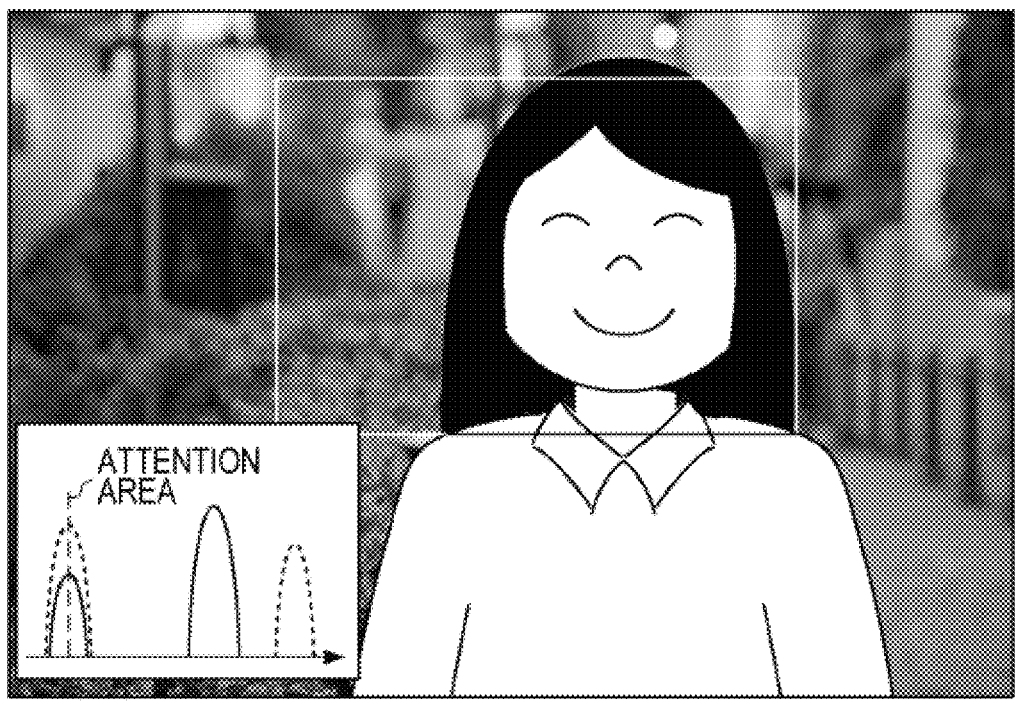

Further, when the histogram is displayed, a histogram indicating the blur prediction amount in the recommended composition and a histogram in the entire image are favorably displayed together, as illustrated in FIG. 22B. In FIG. 22B, as an example of the display, the solid line indicates the blur prediction amount in the entire image, and the dashed line indicates the blur prediction amount in the recommended composition. The histograms are displayed in this way, the user can easily recognize the blur prediction amount in the entire image and the blur prediction amount in the recommended composition. The image segmentation unit 67 performs processing (trimming) of segmenting a range of the recommended composition determined by the recommended composition determination unit 64 from the image. With the segmentation by the image segmentation unit, the image can have a more favorable composition.

[6-2. Processing in an Image Processing Device and an Imaging Device]

Figure 23:
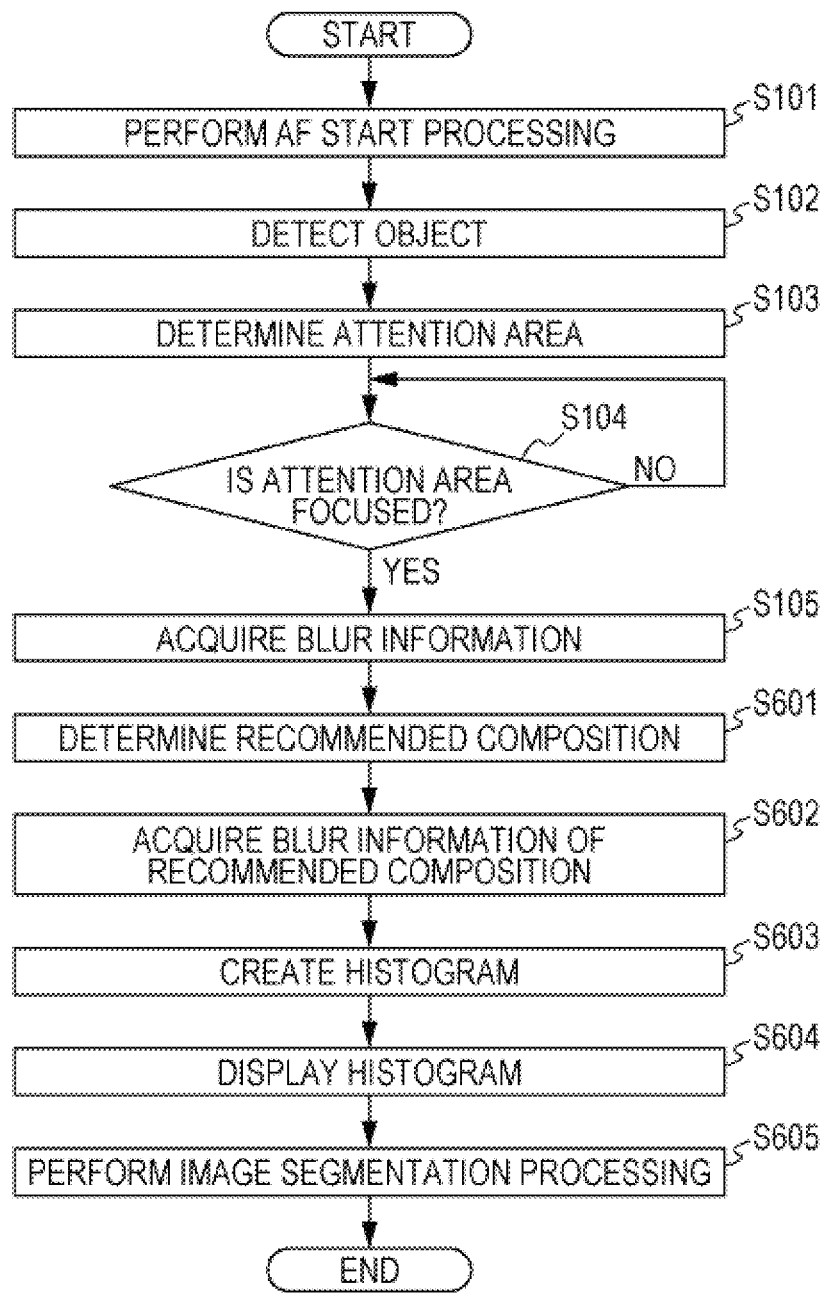
FIG. 23 is a flowchart illustrating a flow of processing in the sixth embodiment.

Next, a flow of processing performed in the image processing device 6 and the imaging device 1600 will be described with reference to FIG. 23. FIG. 23 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S104, object detection, determination of an attention area, and focus determination are performed after AF start processing. Then, in step S105, a blur prediction amount of a non-attention area in the entire image is acquired by a blur information acquisition unit 12.

Next, in step S601, a recommended composition is determined by the recommended composition determination unit 64. Next, in step S602, a blur prediction amount of the non-attention area in the recommended composition is acquired by the blur information acquisition unit 12. Then, in step 603, a histogram indicating blur information is created by the graph creation unit. Then, in step S604, the histogram is displayed in the display unit 1007 by the display control unit 66, as illustrated in FIGS. 22A and 22B.

Next, in step S605, a range of the recommended composition is segmented from the image and a trimming image is generated by the image segmentation unit 67. Note that the segmentation of the image by the image segmentation unit 67 may be automatically performed when the recommended composition is determined by the recommended composition determination unit 64, or may be performed only when an instruction input of the image segmentation is given from the user. The sixth embodiment of the present technology is configured as described above. The sixth embodiment presents the blur prediction amount in the recommended composition with a histogram while presenting the recommended composition, whereby the user can easily recognize what the degree of blur of the image in the recommended composition is like.

7. Seventh Embodiment

[7-1. Configurations of an Image Processing Device and an Imaging Device Including the Image Processing Device]

Figure 24:
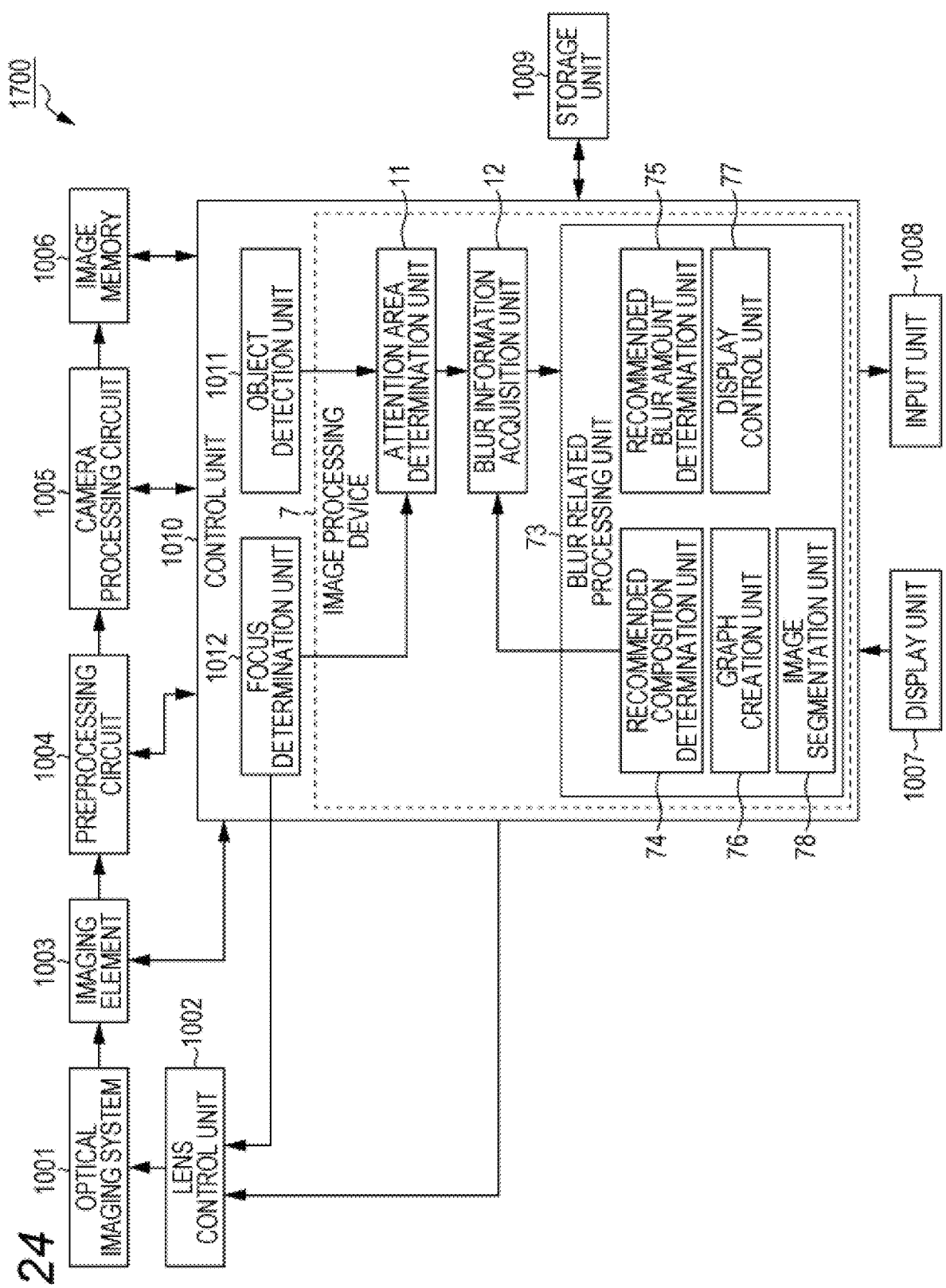
FIG. 24 is a block diagram illustrating a configuration of an imaging device provided with a function of an image processing device according to a seventh embodiment.

Next, a seventh embodiment of the present technology will be described. In the seventh embodiment, an image processing device 7 is also operated in an imaging device 1700. FIG. 24 is a block diagram illustrating a configuration of the imaging device 1700 provided with a function of the image processing device 7 according to the seventh embodiment.

In the image processing device 7 according to the seventh embodiment, a blur related processing unit 73 functions as a recommended composition determination unit 74, a recommended blur amount determination unit 75, a graph creation unit 76, a display control unit 77, and an image segmentation unit 78.

An object to be processed of the image processing device 7 in the seventh embodiment is a frame image that configures a through image. The seventh embodiment presents a recommended blur amount in a recommended composition and a blur prediction amount in the recommended composition to the user with graph display. The recommended composition determination unit 74 is similar to that in the sixth embodiment, and determines a recommended composition that is a composition of recommendation from an image. A determination result of the recommended composition determination unit 74 is supplied to the recommended blur amount determination unit 75 and is also supplied to a blur information acquisition unit 12. The blur information acquisition unit 12 acquires a blur prediction amount in the entire image, and also acquires a blur prediction amount in the recommended composition.

The recommended blur amount determination unit 75 determines a recommended blur amount corresponding to the recommended composition determined by the recommended composition determination unit 74. The recommended blur amount is a recommended blur amount in the composition, corresponding to each composition. The recommended blur amount is, for example, obtained by referring to a table in which a composition and a recommended blur amount are associated.

In the seventh embodiment, first, a recommended composition in an image is determined by the recommended composition determination unit 74. Next, the recommended blur amount determination unit 75 determines a recommended blur amount in the recommended composition. For example, when the determined recommended composition is so-called a whole body shot, in which the whole body of a person that is an attention area appears, the recommended blur amount determination unit 75 determines a recommended blur amount that a blur prediction amount of a non-attention area is favorably small (blur prediction amount<first blur threshold).

Further, when the determined recommended composition is close-up of a face of the person that is the attention area, the recommended blur amount determination unit 75 determines a recommended blur amount that the blur amount of the non-attention area is favorably large (third threshold<blur amount).

Further, when the determined recommended composition is so-called a bust shot of the person that is the attention area, the recommended blur amount determination unit determines a recommended blur amount that the blur amount of the non-attention area is favorably about between the whole body shot and the close up of the face (second blur threshold<blur amount<third blur threshold). Note that a relationship among the first to third thresholds is as described in the following expression 1:

First blur threshold<Second blur threshold<Third blur threshold   (1)

Figure 25A:
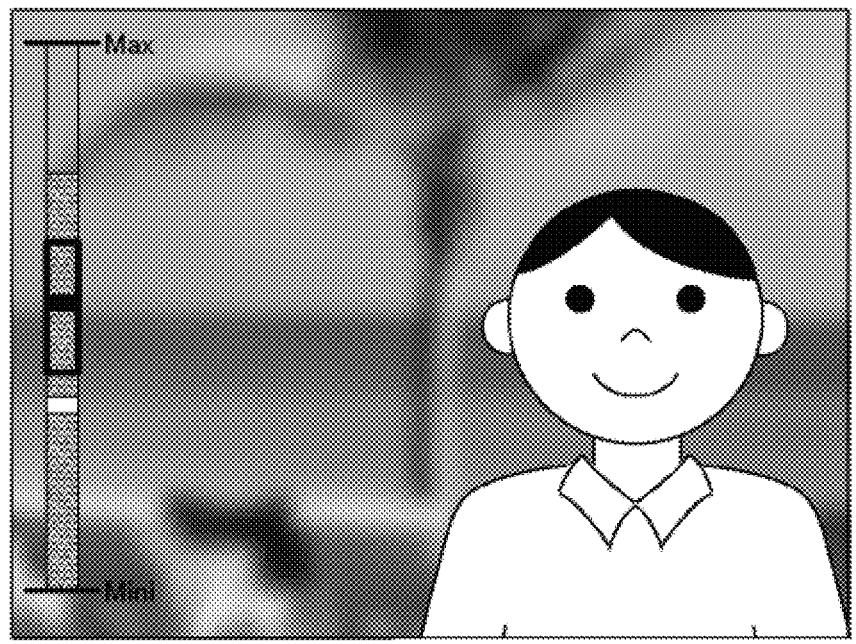
FIGS. 25A and 25B are diagrams illustrating display forms in the seventh embodiment.

The determined recommended composition and the recommended blur amount are supplied to the graph creation unit 76. The graph creation unit 76 creates a graph like the one illustrated in FIGS. 25A and 25B. In the example of the graphs of FIGS. 25A and 25B, the height of a bar graph indicates a range of the blur amount that can be realized by a present attention area, a focal distance, and a maximum aperture of a lens. Further, a mark superimposed and displayed in a bar graph manner indicates a blur prediction amount in the present F-number.

Further, a frame that indicates a range is displayed on the bar graph, whereby a recommended blur amount in the composition is indicated. The recommended blur amount can present a range of the recommended blur amount by being displayed with the frame. Further, an icon presents a blur prediction amount of when an image is trimmed by the recommended composition. Accordingly, the user can easily recognize what kind of photograph having what blur amount can be acquired by capturing the photograph by what kind of composition. Further, the blur prediction amount in the entire image may be presented with an icon.

Figure 25B:
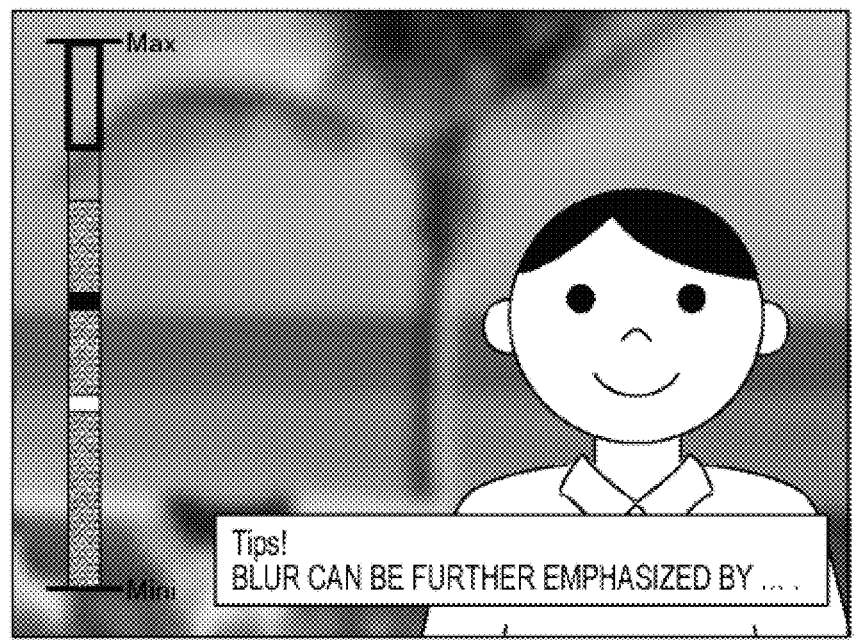

Further, as illustrated in FIG. 25B, when the recommended blur amount falls outside the range of the blur amount that can be realized, tips indicating how the blur amount is increased may be displayed by a character string. The image segmentation unit 78 performs processing of segmenting the range of the recommended composition determined by the recommended composition determination unit 74, from the image. With the segmentation by the image segmentation unit 78, the image can have a more favorable composition.

[7-2. Processing in an Image Processing Device and an Imaging Device]

Figure 26:
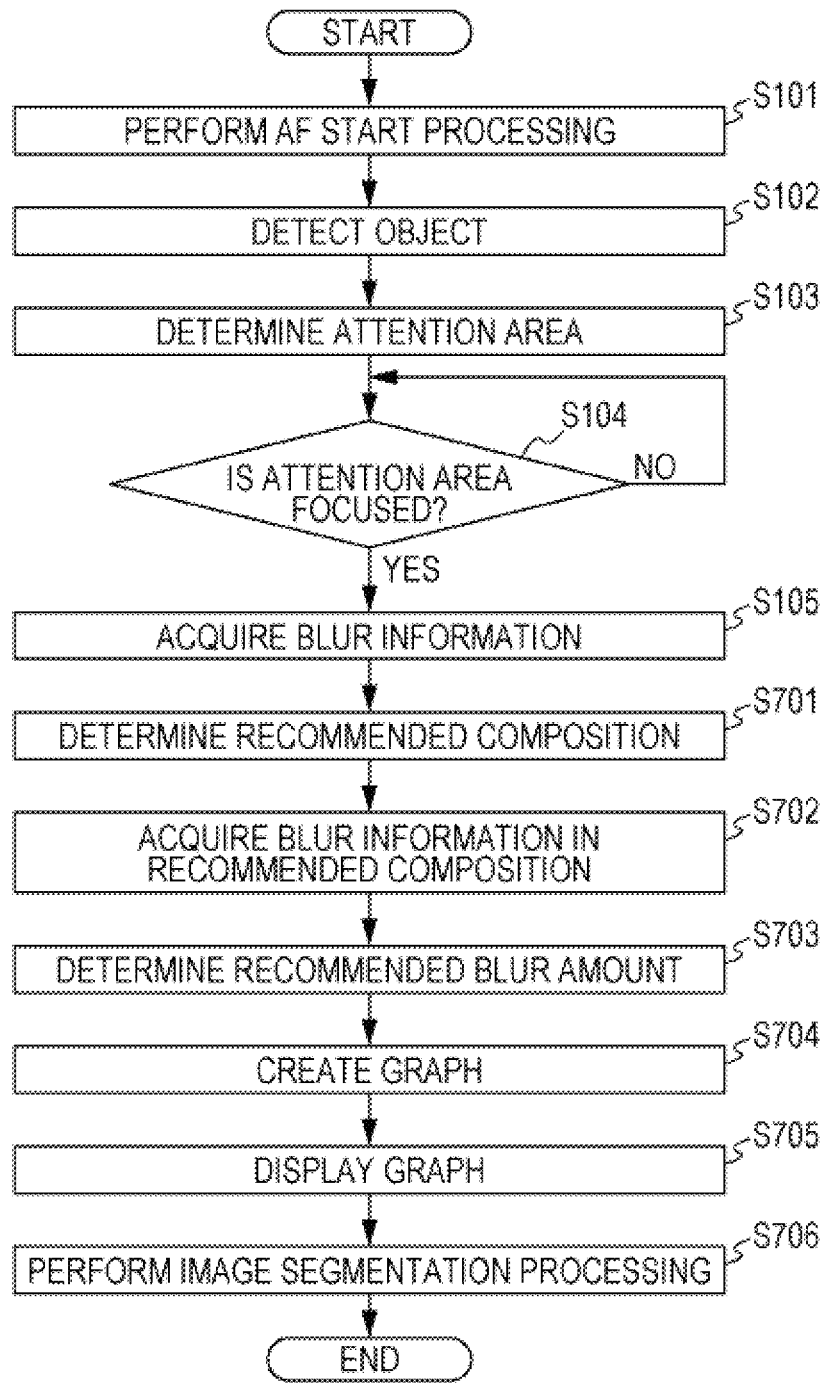
FIG. 26 is a flowchart illustrating a flow of processing in the seventh embodiment.

Next, a flow of processing performed in the image processing device 7 and the imaging device 1700 will be described with reference to FIG. 26. FIG. 26 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S701, a recommended composition is determined by the recommended composition determination unit 74. Next, in step S702, a blur prediction amount in the recommended composition is acquired by the blur information acquisition unit 12. Next, in step S703, a recommended blur amount in the recommended composition is determined by the recommended blur amount determination unit 75. Next, in step S704, a graph for presenting the blur prediction amount, the recommended blur amount, and the blur prediction amount in the recommended composition is created by the graph creation unit 76. Next, in step S705, the graph is displayed in a display unit 1007 by the display control unit 77.

Then, in step S706, the range of the recommended composition is segmented from the image by the image segmentation unit 78, and a trimming image is generated. Note that the segmentation of the image by the image segmentation unit 78 may be automatically performed when the recommended composition is determined by the recommended composition determination unit 74, or may be performed only when an instruction input of the image segmentation is given from the user.

The seventh embodiment of the present technology is configured as described above. According to the seventh embodiment, a recommended blur amount in a recommended composition and a blur prediction amount in the recommended composition are presented with graph display, whereby the user can capture an image using these pieces of information as a reference.

8. Eighth Embodiment

[8-1. Configurations of an Image Processing Device and an Imaging Device Including the Image Processing Device]

Figure 27:
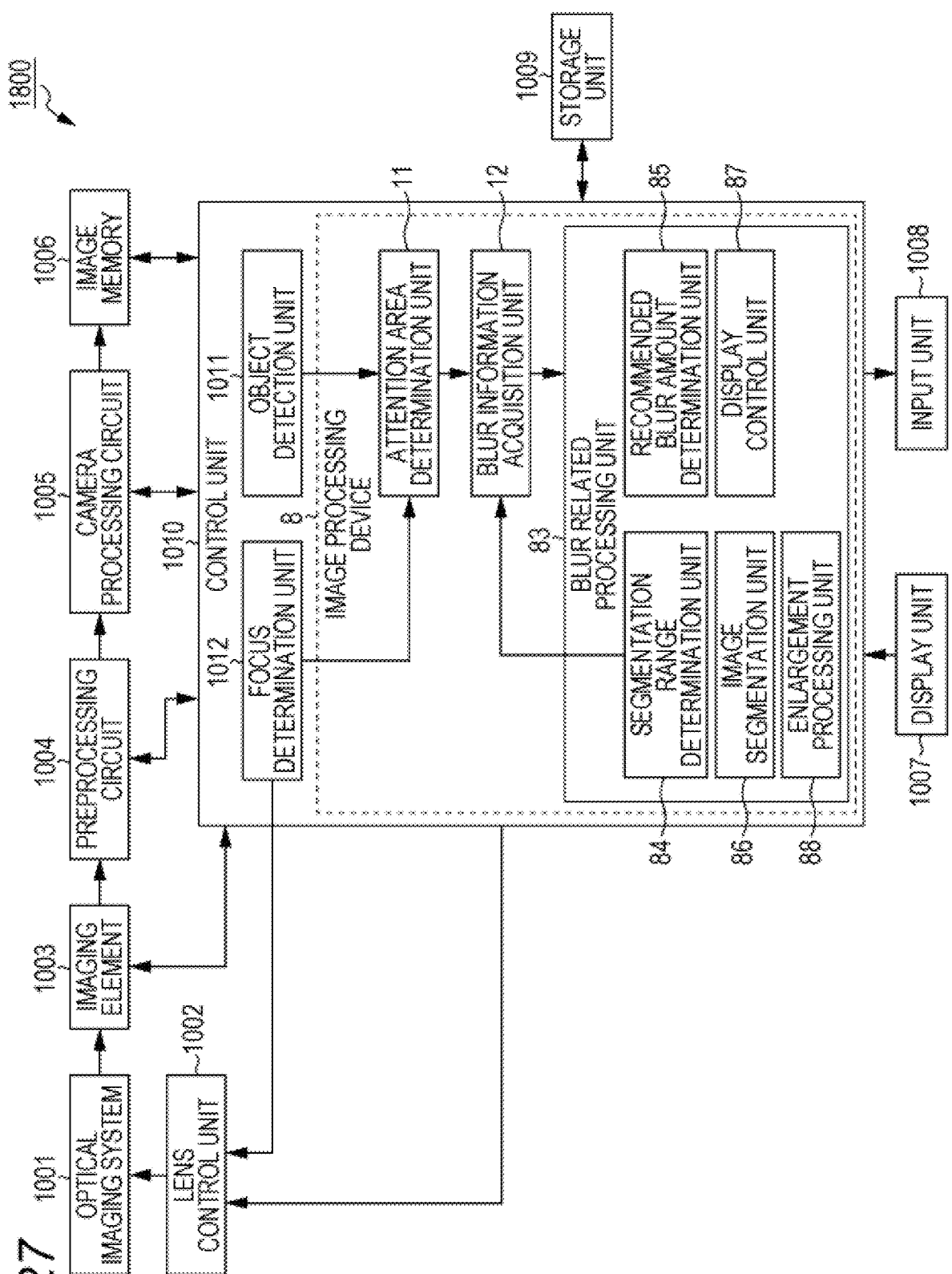
FIG. 27 a block diagram illustrating a configuration of an imaging device provided with a function of an image processing device according to an eighth embodiment.

Next, an eighth embodiment of the present technology will be described. In the eighth embodiment, an image processing device 8 is also operated in an imaging device 1800. FIG. 27 is a block diagram illustrating a configuration of the imaging device 1800 provided with a function of the image processing device 8 according to the eighth embodiment.

The image processing device 8 according to the eighth embodiment is different from the first embodiment in that a blur related processing unit 83 functions as a segmentation range determination unit 84, a recommended blur amount determination unit 85, an image segmentation unit 86, a display control unit 87, and an enlargement processing unit 88. Configurations other than the above are similar to those in the first embodiment, and thus description is omitted.

An object to be processed of the image processing device 8 in the eighth embodiment is a captured image acquired by an imaging device. The eighth embodiment performs segmentation processing (trimming) of the image according to blur information in the image.

By trimming the captured image, the image can have a more favorable composition. However, a segmentation range has various shapes and positions. Therefore, the eighth embodiment determines a segmentation range such that the degree of blur in the image stands out according to blur information.

Segmentation of an image will be described with reference to FIGS. 28A and 28B using a thirds composition as an example. First, the segmentation range determination unit 84 sets a plurality of candidates of a segmentation range by a thirds composition. For example, the candidates of the segmentation range can be determined such that a space having a predetermined size is formed in a direction where a non-attention area exists in the image.

Figure 28A:
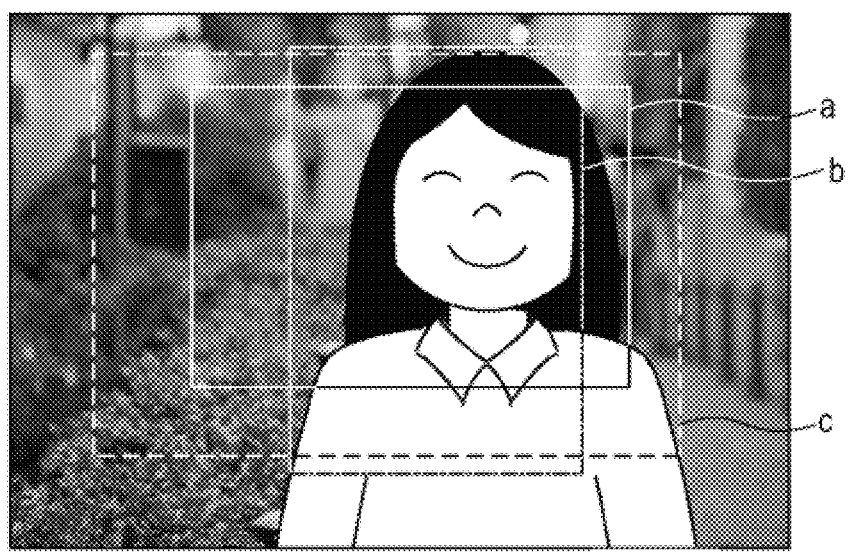
FIGS. 28A and 28B are diagrams describing segmentation of an image in the eighth embodiment.

As illustrated in FIG. 28A, a plurality of candidates exists in size and position in a thirds composition, for example. In FIG. 28A, three segmentation ranges are illustrated as examples of the candidates. Note that the composition is not limited to a thirds composition. A plurality of other composition data, such as a golden ratio composition, is stored in advance as templates, and the composition is favorably selected based on selection of the user or other conditions. Alternatively, for example, when a segmentation range extends outside the image in a thirds composition, the composition may be changed to a golden ratio composition.

When having determined the segmentation range candidates, the segmentation range determination unit 84 supplies composition candidate information to the blur information acquisition unit 12 and the recommended blur amount determination unit 85. The blur information acquisition unit 12 acquires a blur prediction amount of each segmentation range candidate, and supplies the blur prediction amount to the segmentation range determination unit 84. Further, the recommended blur amount determination unit 85 determines a recommended blur amount in each segmentation range candidate. The recommended blur amount determination unit 85 is similar to that of the seventh embodiment. The recommended blur amount of each segmentation range candidate is supplied to the segmentation range determination unit 84.

The segmentation range determination unit 84 determines a segmentation range from the plurality of segmentation range candidates based on three criteria: a composition where the blur prediction amount is closest to the recommended blur amount; a position where the blur prediction amount in a segmentation range is closest to the recommended blur amount; and a position where the degree of separation of the blur prediction amounts of the attention area and the non-attention area is highest. Note that a weight of each criterion may be changed for each composition.

Figure 28B:
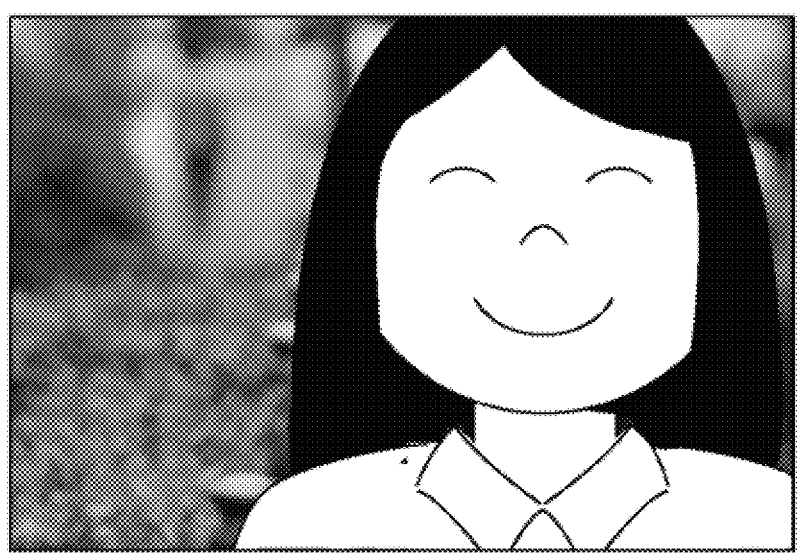
Figure 28C:
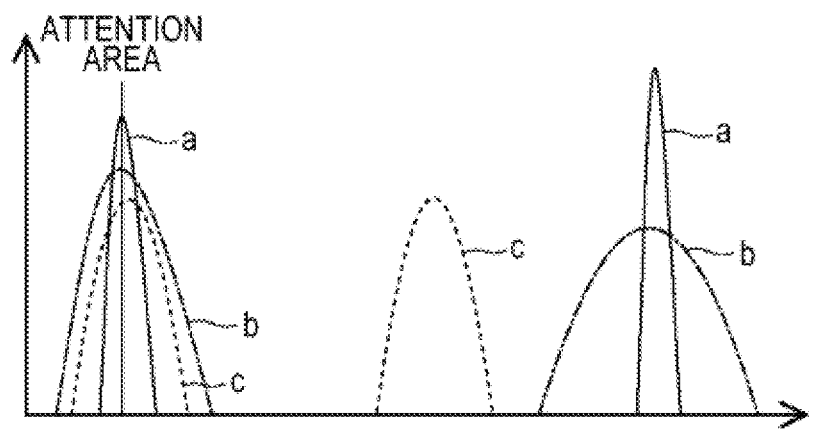
FIG. 28C is a diagram illustrating a histogram used for composition determination.

Whether the degree of separation of the blur amounts is high can be determined by showing the blur prediction amounts of the attention area and the non-attention area in each composition as histograms, as illustrated in FIG. 28C. In the example of FIG. 28C, among compositions a, b, and c, the attention area and the non-attention area are most separated in the composition a. The composition a has a small trimming area, and thus the blur amount becomes largest when the image is enlarged. Further, an area where the blur amount is small (the portion of the face) and an area where the blur amount is large (the background) are clearly separated in the composition a, and thus the composition a has a steep mountain like area, as illustrated by the histogram of FIG. 28C. The size of the trimming area of the composition b is almost the same as that of the composition a. However, the larger blur area side includes middle to large wide ranges of blur amounts. Therefore, the composition b has a gently sloping mountain like area, as illustrated by the histogram of FIG. 28C. The composition c has a large trimming area, and an emphasized blur amount is smaller than those of the compositions a and b. A larger blur amount maintain exists in the middle of the horizontal axis. Note that the composition a, the composition b, and the composition c are compositions as specific examples set for convenience of description.

Therefore, when the composition a is selected as the segmentation range, and the segmentation of the image is executed, the image becomes the one illustrated in FIG. 28B. By performing the segmentation processing of a captured image in this way, the image can have a more favorable composition, and the degree of blur of the non-attention area can be further emphasized.

Figure 29C:
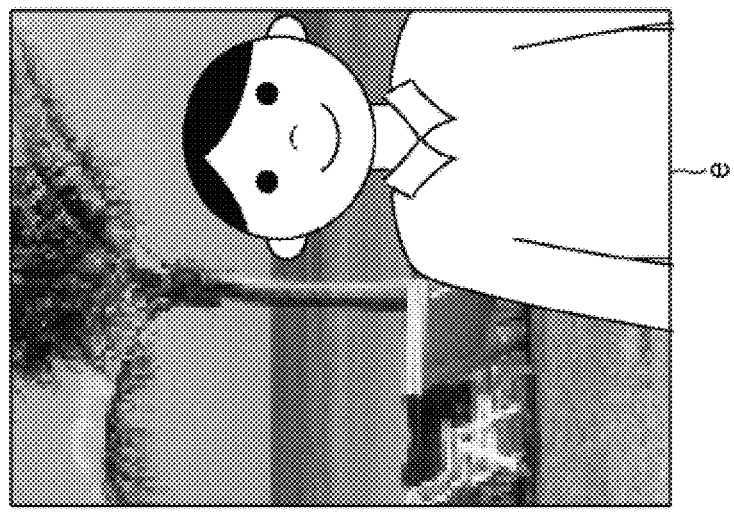
FIGS. 29A to 29C are diagrams describing a second example of image segmentation in the eighth embodiment.
Figure 29A:
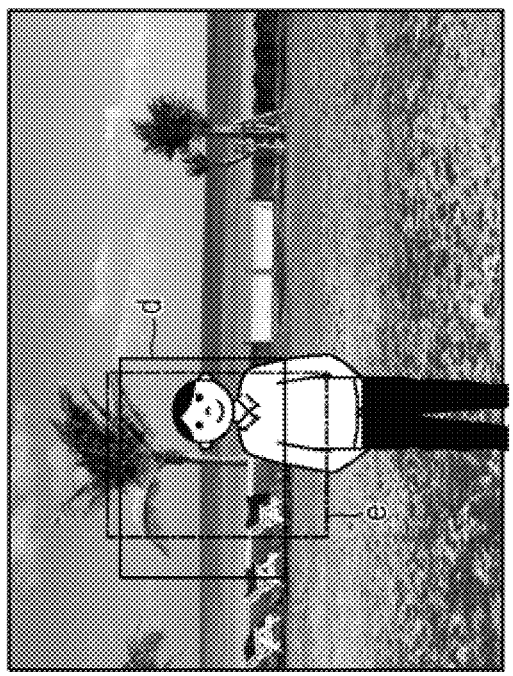
Figure 29B:
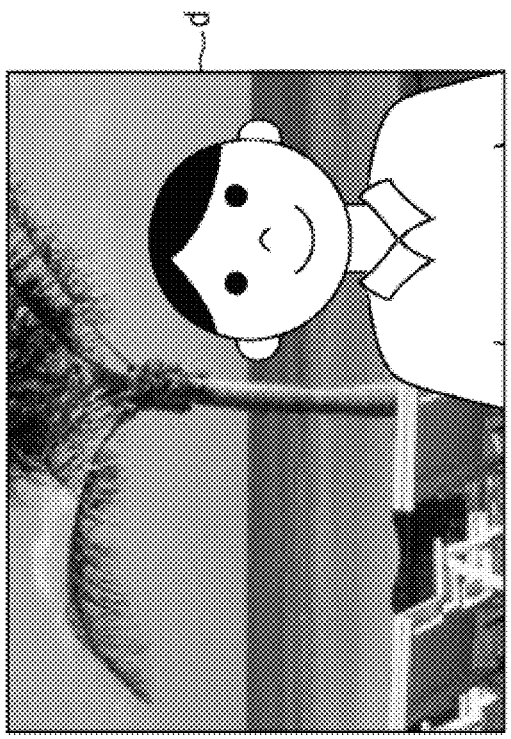

Note that, when a diaphragm bracket function is turned ON, a diaphragm is changed suitable for each composition candidate and bracket image capturing may be performed. Here, a case in which one segmentation range is to be determined from among a plurality of composition candidates based on the three criteria, and the recommended blur amounts of the plurality of compositions are almost the same will be described. Image segmentation is performed with respect to all of the segmentation ranges of the plurality of compositions having almost the same recommended blur amounts, and trimming images are favorably presented to the user. For example, as illustrated in FIG. 29A, when there are two composition candidates of a composition d and a composition e, and the recommended blur amounts of these two compositions are almost the same, trimming is performed for each of the compositions d and e. FIG. 29B illustrates a trimming image based on the composition d, and FIG. 29C is a trimming image based on the composition e.

Then, the plurality of types of trimming images is presented to the user, and the user may be prompted to select any of the trimming images. This enables the user to acquire an image having the degree of blur that suits to own taste.

Note that the segmentation range of the image may be variable with respect to an aspect of an original image. For example, when the aspect of the original image is "4:3", the segmentation range may be changeable to "3:2" or "16:9" according to characteristics of the object. The enlargement processing unit 88 performs processing of enlarging the trimming image to an original image size using a super-resolution technique when storing the trimming image in the storage unit 1009. Accordingly, the image has a more emphasized degree of blur than before the trimming.

[8-2. Processing in an Image Processing Device and an Imaging Device]

Figure 30:
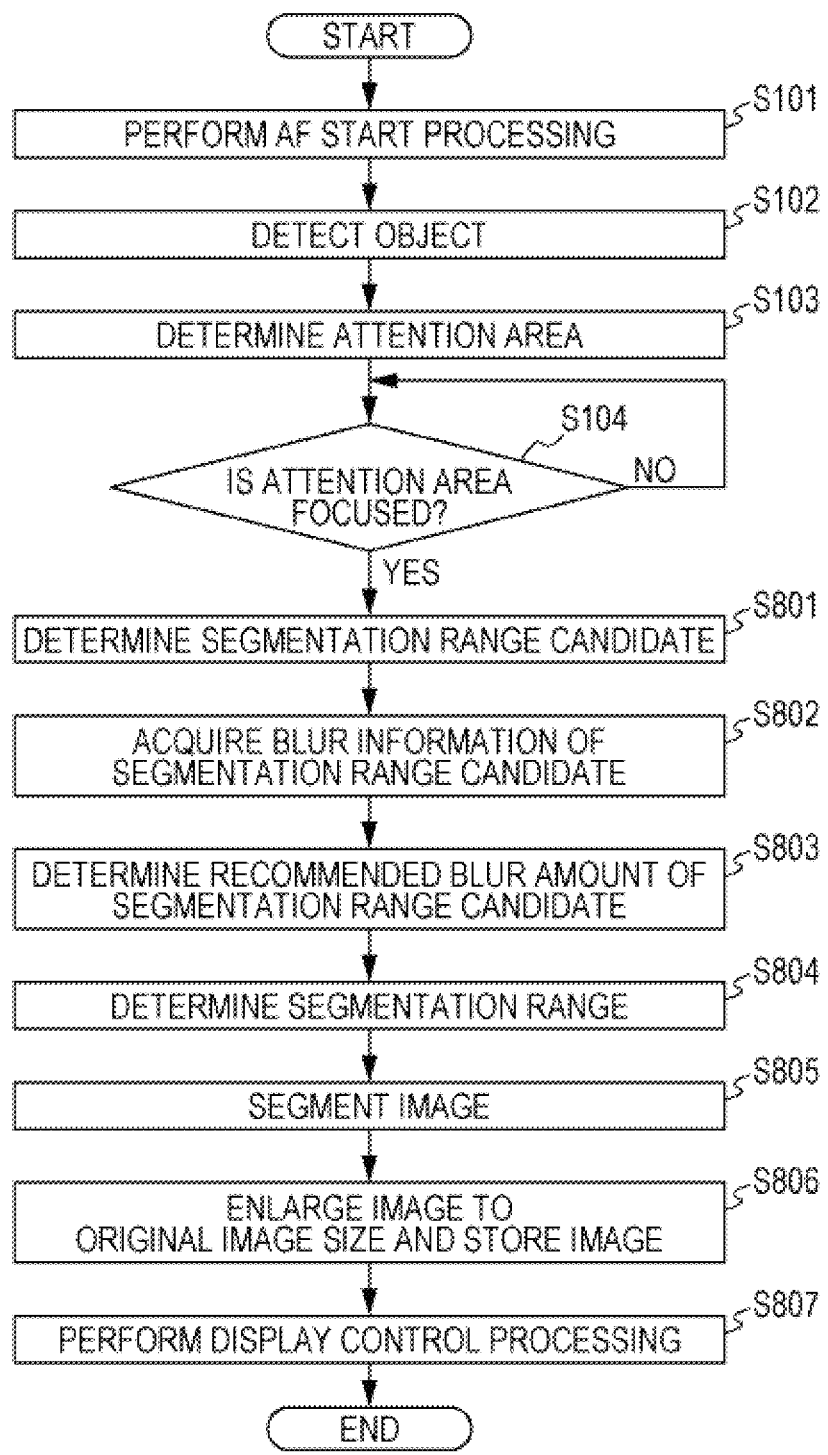
FIG. 30 is a flowchart illustrating a flow of processing in the eighth embodiment.

Next, a flow of processing performed in the image processing device 8 and the imaging device 1800 will be described with reference to FIG. 30. FIG. 30 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S104, object detection, determination of an attention area, and focus determination are performed after AF start processing. Then, in step S801, a segmentation range candidate is determined by the segmentation range determination unit 84. Next, in step S802, a blur prediction amount of the segmentation range candidate is acquired by the blur information acquisition unit 12. Next, in step S803, a recommended blur amount of the segmentation range candidate is determined by the recommended blur amount determination unit 85.

Then, in step S804, the segmentation range of the image is determined by the segmentation range determination unit 84. Segmentation range information is supplied to the image segmentation unit 86. Next, in step S805, the segmentation range is segmented from the image by the image segmentation unit 86.

Next, in step S806, the trimming image is enlarged to an original image size by the enlargement processing unit 88 using a super-resolution technique, and is stored in the storage unit 1009. Then, a segmented image is displayed in a display unit 1007 by the display control unit 87, as illustrated in FIG. 28B, or FIG. 29B or 29C.

Accordingly, the user can confirm the segmented image. Note that, when the segmented image is displayed in the display unit 1007, the image to which the enlargement processing has been applied by the enlargement processing unit 88 is favorably displayed.

The eighth embodiment of the present technology is configured as described above. According to the eighth embodiment, segmentation of an image is performed based on blur information in the image, whereby an image in which the degree of blur is emphasized can be created. Further, an image can be segmented in a range considering blurs in a principal object (attention area) and a background (non-attention area), and an impressive segmented image, which is different from a composition that includes the entire object area, can be provided.

9. Ninth Embodiment

[9-1. Configurations of an Image Processing Device and an Imaging Device Provided with a Function of the Image Processing Device]

Figure 31:
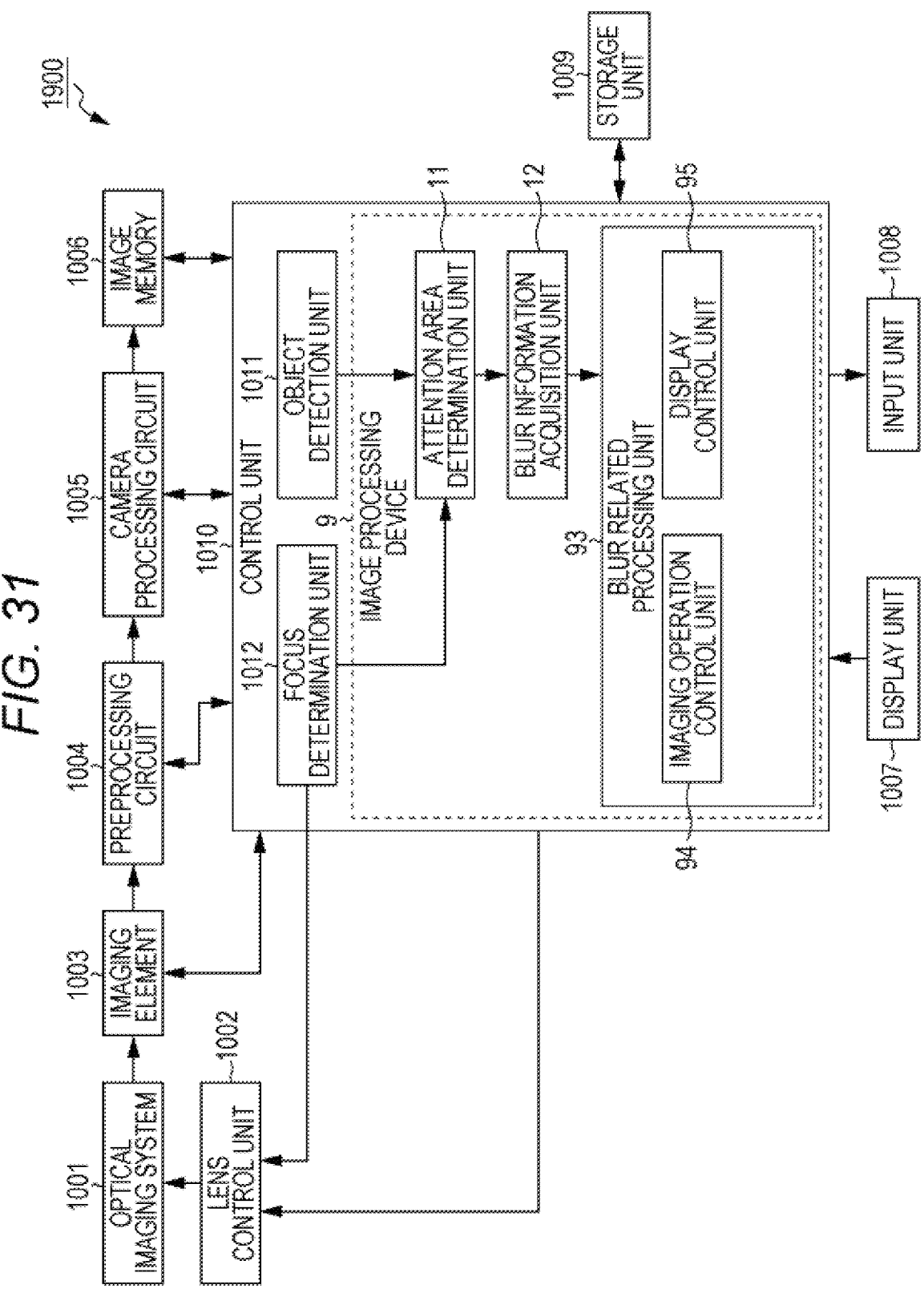
FIG. 31 is a block diagram illustrating a configuration of an imaging device provided with a function of an image processing device according to a ninth embodiment.

Next, a ninth embodiment of the present technology will be described. In the ninth embodiment, an image processing device 9 is also operated in an imaging device 1900. FIG. 31 is a block diagram illustrating a configuration of the image processing device 9 according to the ninth embodiment.

The image processing device 9 according to the ninth embodiment is different from the first embodiment in that a blur related processing unit 93 functions as an imaging operation control unit 94 and a display control unit 95. Configurations other than the above are similar to those in the first embodiment, and thus description is omitted. An object to be processed of the image processing device 9 in the ninth embodiment is a frame image that configures a through image. The imaging operation control unit 94 controls execution of a diaphragm bracket image capturing mode by transmitting a predetermined control signal to the lens control unit 1002. The diaphragm bracket image capturing mode is an image capturing mode to acquire a plurality of images having different diaphragm aperture diameters by a single image capturing operation. A plurality of images is acquired by changing the aperture diameters of a diaphragm, and thus a plurality of images having different blur amounts can be acquired at single image capturing.

When a diaphragm bracket is executed in a direction of making the F-number larger than the present setting, a plurality of images having smaller blur amounts in a non-attention area than a present image can be acquired, as illustrated in FIGS. 32B to 32D. In FIGS. 32A to 32D, FIG. 32A illustrates an image in present setting, and the F-number becomes larger and the images have smaller blur amounts in the non-attention area, in order of FIGS. 32B, 32C, and 32D.

Figure 33B:
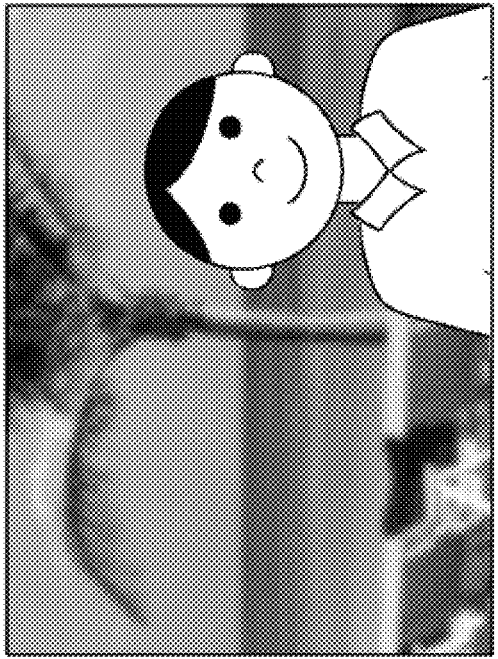
FIGS. 33A to 33D are diagrams illustrating a second example of an image acquired by the diaphragm bracket image capturing in the ninth embodiment.
Figure 33D:
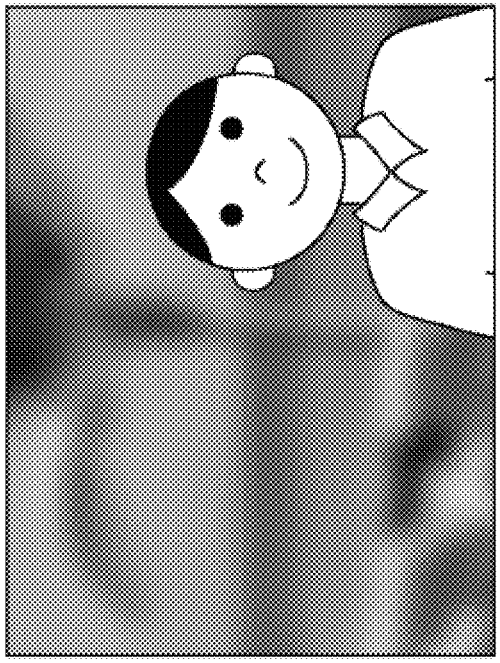
Figure 33A:
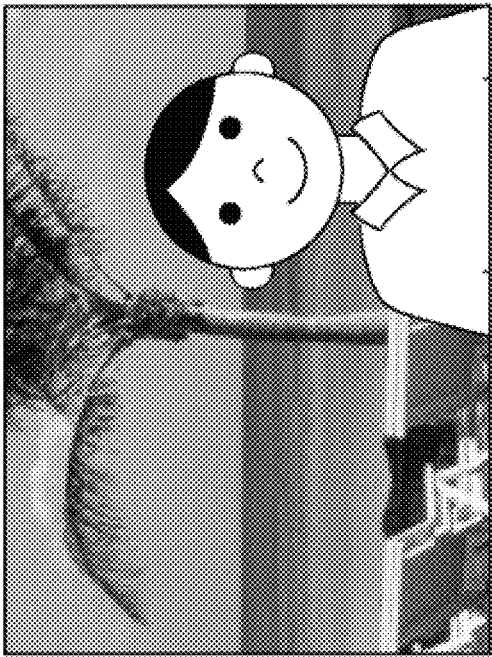
Figure 33C:
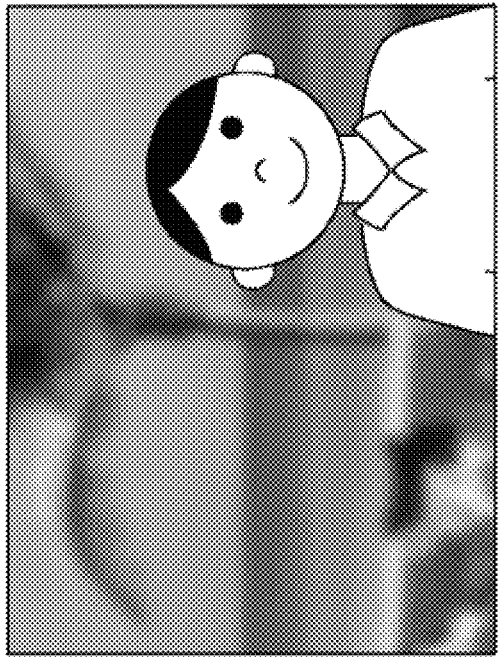

Further, when the diaphragm bracket is executed in a direction of making the F-number smaller than the present setting, a plurality of images having larger blur amounts in the non-attention area than the present image can be acquired, as illustrated in FIGS. 33B to 33D. In FIGS. 33A to 33D, FIG. 33A illustrates an image in the present setting, and the F-number becomes smaller and the images have larger blur amounts in the non-attention area, in order of FIGS. 33B, 33C, and 33D.

Further, the F-number is changed before and after the present setting of the F-number, and the diaphragm bracket can be executed. Accordingly, an image having a larger blur amount and an image having a smaller blur amount than the present image can be acquired at single image capturing.

The display control unit 95 displays the image acquired by the diaphragm bracket image capturing in a display unit 1007.

[9-2. Processing in an Image Processing Device and an Imaging Device]

Figure 34:
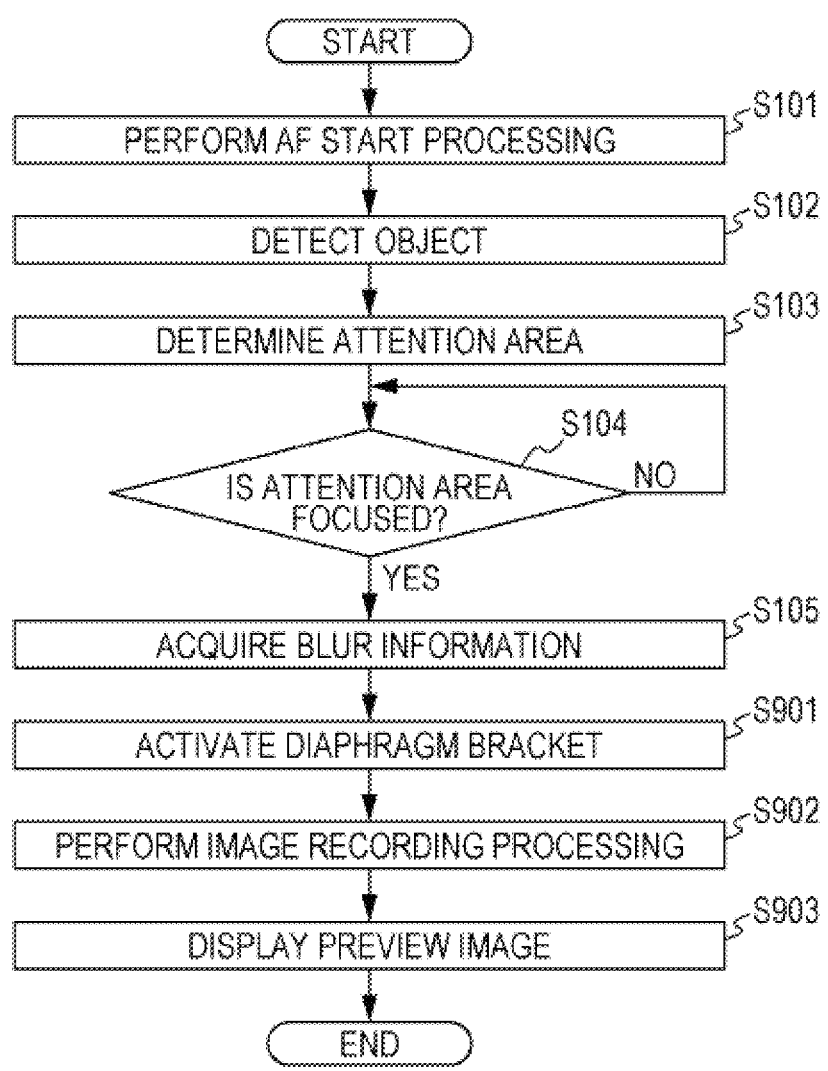
FIG. 34 is a flowchart illustrating a flow of processing in the ninth embodiment.

Next, a flow of processing performed in the image processing device 9 and the imaging device 1900 will be described with reference to FIG. 34. FIG. 34 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S901, the imaging operation control unit 94 activates the diaphragm bracket image capturing mode according to the blur amount. The imaging operation control unit 94 executes the diaphragm bracket in a direction of making the F-number larger than the present setting when the blur amount is a predetermined amount or more. Accordingly, a plurality of images having smaller blur amounts in the non-attention area than the present image can be acquired, as illustrated in FIGS. 32B to 32D. Further, the imaging operation control unit 94 executes the diaphragm bracket in a direction of making the F-number smaller than the present setting when the blur amount is a predetermined amount or less. Accordingly, as illustrated in FIGS. 33B to 33D, a plurality of images having larger blur amounts in the non-attention area than the present image can be acquired.

Next, in step S902, recording processing of the plurality of images acquired by the diaphragm bracket image capturing is performed by the control unit 1010. The captured image is, for example, stored in a storage unit 1009 in a compressed state based on a standard such as JPEG. Note that the plurality of images captured by the diaphragm bracket image capturing may be associated and stored by tagging or the like as mutually associated images. Further, exchangeable image file format (EXIF) data including information related to the stored image and additional information such as a date and time of imaging may also be stored in association with the image. Then, in step S903, the captured image captured by the diaphragm bracket is displayed in the display unit 1007 as a preview image by the display control unit 95. Accordingly, the user can instantly confirm the image captured by the diaphragm bracket.

The ninth embodiment of the present technology is configured as described above. According to the ninth embodiment, the diaphragm bracket image capturing is automatically executed according to the blur information. Therefore, for a user who does not know the existence of the diaphragm bracket function or a user who knows the diaphragm bracket function but has a low frequency of use, an image acquired by the diaphragm bracket image capturing can be provided.

10. Tenth Embodiment

[10-1. Configurations of an Image Processing Device and an Imaging Device Provided with a Function of the Image Processing Device]

Figure 35:
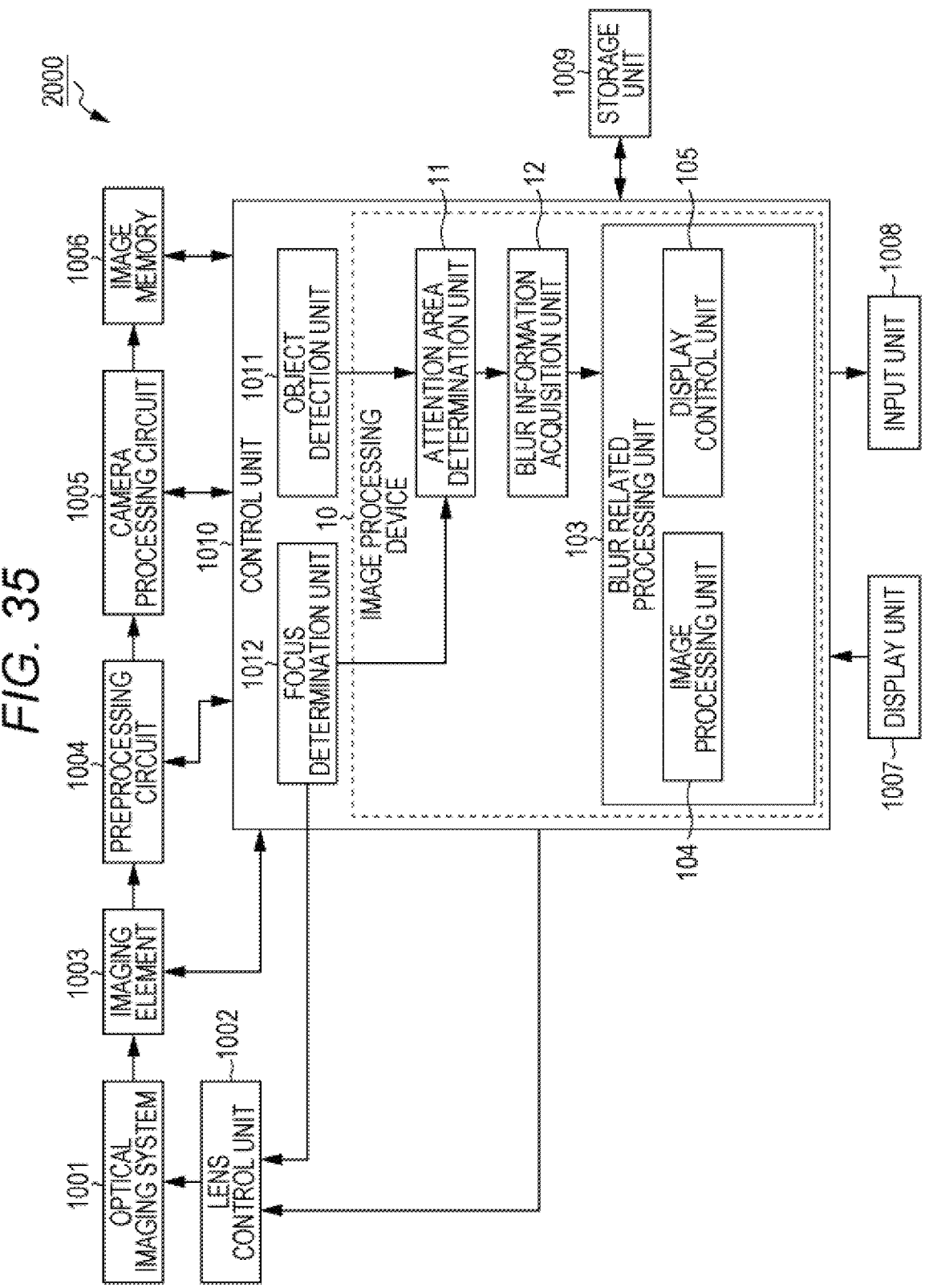
FIG. 35 is a block diagram illustrating a configuration of an imaging device provided with a function of an image processing device according to a tenth embodiment.

Next, a tenth embodiment of the present technology will be described. In the tenth embodiment, an image processing device 10 is also operated in an imaging device 2000. FIG. 35 is a block diagram illustrating a configuration of the imaging device 2000 provided with a function of the image processing device 10 according to the tenth embodiment.

The image processing device 10 according to the tenth embodiment is different from the first embodiment in that a blur related processing unit 103 functions as an image processing unit 104 and a display control unit 105. Configurations other than the above are similar to those in the first embodiment, and thus description is omitted. An object to be processed of the image processing device 1 in the tenth embodiment is a frame image that configures a through image. The tenth embodiment applies shading off processing to a captured image captured by the imaging device 2000. This enables an image having a less blur amount at the time of capturing to be an image having a large blur amount.

Figure 36A:
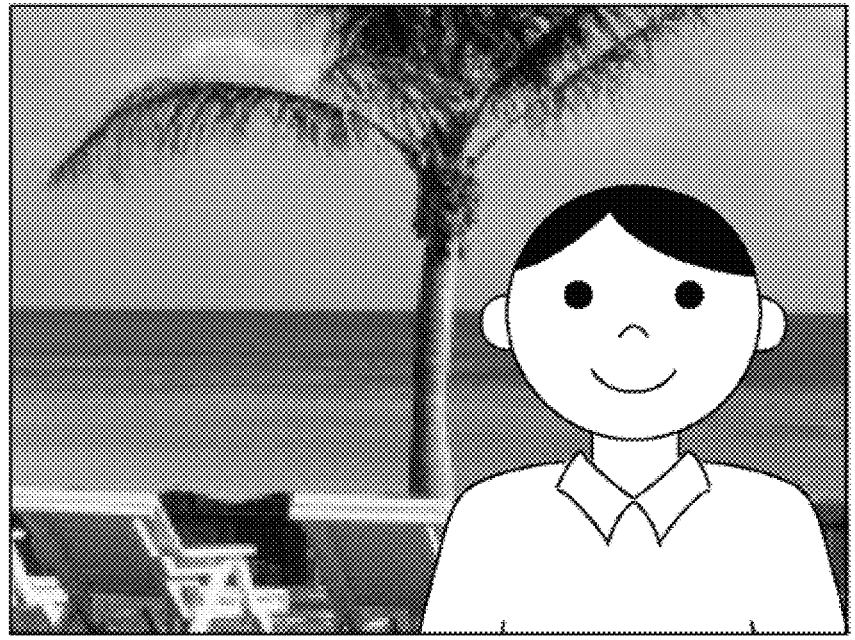
FIGS. 36A and 36B are diagrams illustrating an example an image to which image processing has been applied in the tenth embodiment.
Figure 36B:
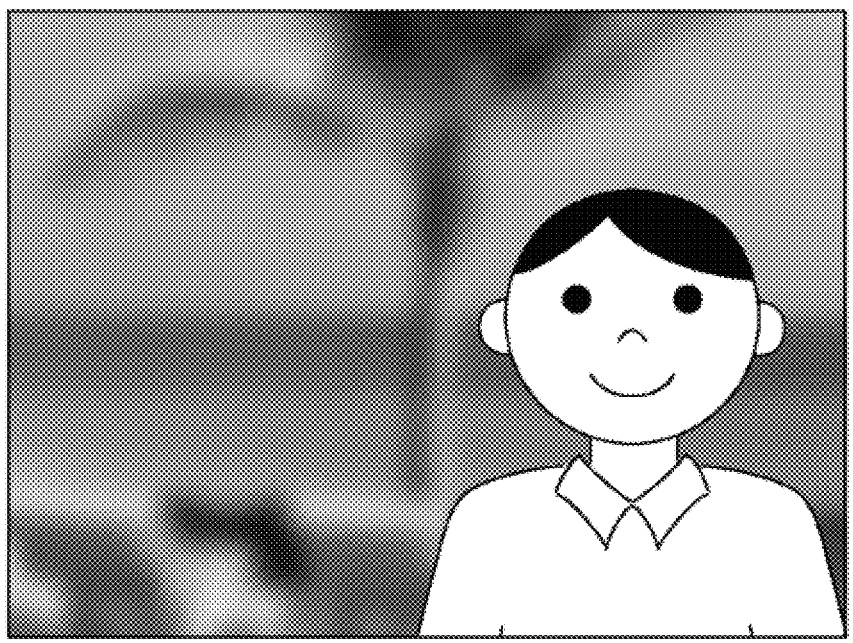

The image processing unit 104 applies the shading off processing to a non-attention area of the captured image based on known image shading off algorithm. By applying the shading off processing to the non-attention area of the image, the image is changed from a state illustrated in FIG. 36A to a state illustrated in FIG. 36B. In FIG. 36B, the background other than a person as an attention area is blurred, compared with FIG. 36A. When a blur amount of the non-attention area is a predetermined amount or more, the blur related processing unit 103 causes the image processing unit 104 to execute background shading off processing. The display control unit 105 displays an image to which the shading off processing has been applied by the image processing unit 104 in a display unit 1007.

[10-2. Processing in an Image Processing Device and an Imaging Device]

Figure 37:
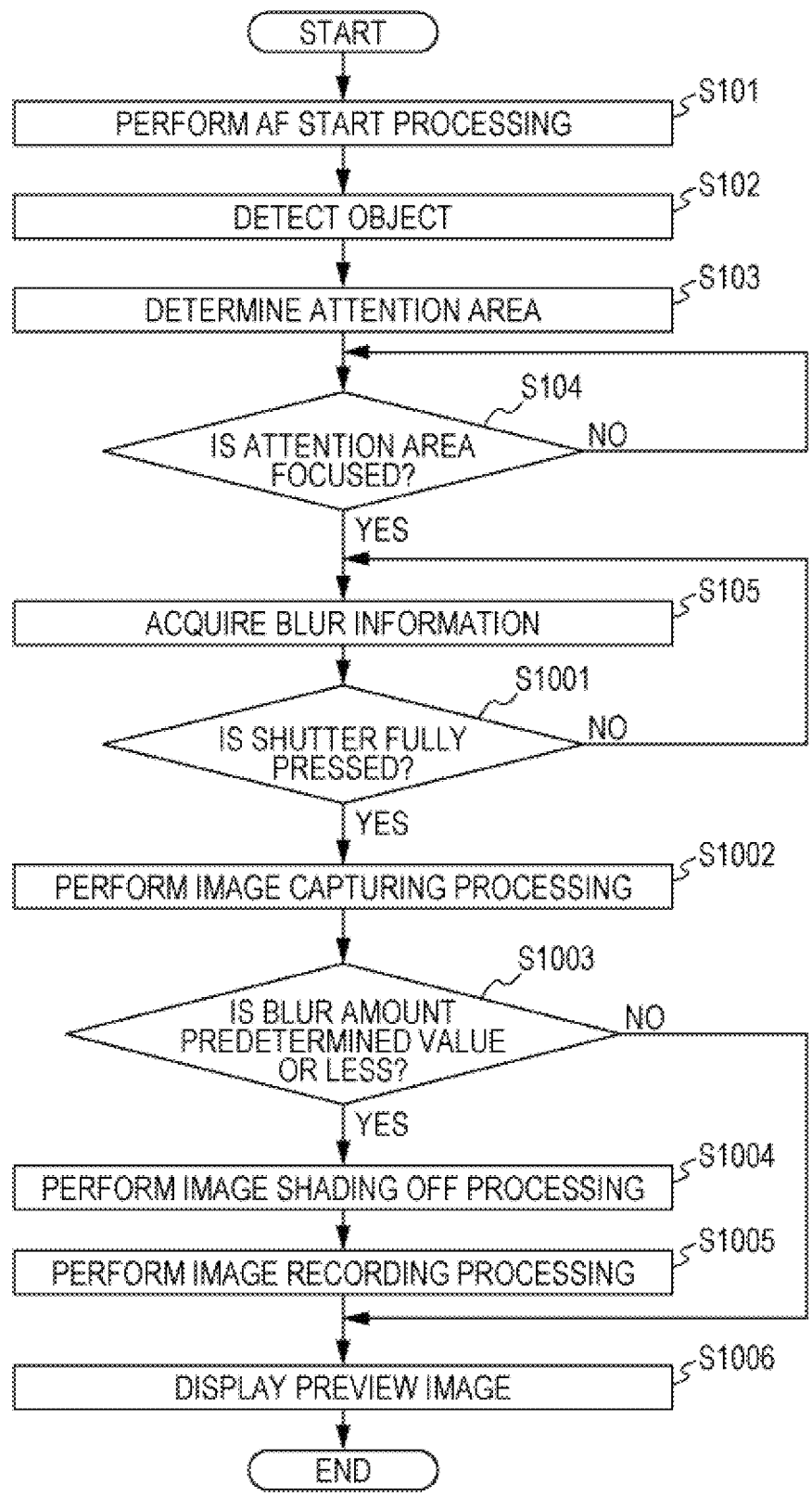
FIG. 37 is a flowchart illustrating a flow of processing in the tenth embodiment.

Next, a flow of processing performed in the image processing device 10 and the imaging device 2000 will be described with reference to FIG. 37. FIG. 37 is a flowchart illustrating a flow of processing. Assume that image data to be processed has been supplied, and the focal distance and the F-number have been acquired. Note that processing similar to that in the first embodiment is denoted with the same step numbers and description is omitted.

In steps S101 to step S105, object detection, attention area determination, focus determination, and blur information acquisition are performed after AF start processing. Then, in step S1001, whether a full press operation of a shutter has been performed by the user is determined. The acquisition of blur information in step S105 and the determination of step S1001 are repeated until the full press operation of a shutter is performed (No in step S1001).

When the full press operation of a shutter has been performed by the user, the processing proceeds to step S1002 (Yes in step S1001). Next, in step S1002, image capturing processing is performed in the imaging device 2000, and an image is acquired. Next, in step S1003, whether a blur amount of when the image is captured is a predetermined value or less is determined.

When the blur amount is the predetermined value or less, the processing proceeds to step S1004 (Yes in step S1003).

Then, in step S1004, shading off processing is applied to a non-attention area of the captured image by the image processing unit 104. By applying the shading off processing to the image when the blur amount is the predetermined amount or less, the image processing unit 104 can make the degree of blur of the non-attention area of the image having a less degree of blur large. Accordingly, the user can easily obtain an image having a blur background.

Next, in step S1005, recording processing of the image to which the shading off processing has been applied is performed. The captured image is, for example, stored in a storage unit 1009 in a compressed state based on a standard such as JPEG under control of a control unit 1010. Further, EXIF data including additional information, such as information related to the stored image, and a date and time of imaging may also be stored in association with the image.

Then, in step S1006, the captured image to which the shading off processing has been applied is displayed in the display unit 1007 as a preview image by the display control unit 105. Accordingly, the user can instantly confirm the image to which the shading off processing has been applied.

Description is returned to step S1003. In step S1003, when it has been determined that the blur amount is the predetermined about or less, the processing proceeds to step S1006 (No in step S1003). Then, in step S1006, the captured image is displayed in the display unit 1007 as a preview image by the display control unit 105. Note that, in this case, steps S1004 and S1005 have not been performed, and thus the image displayed in the display unit 1007 is an image to which the shading off processing has not been applied.

The tenth embodiment is configured as described above. According to the tenth embodiment, even the user who is not familiar with an operation of a camera and has difficulty in capturing a blur image can easily acquire a blur image. Further, even in a case where it is difficult to acquire a blur image by diaphragm control of the imaging device, a blur image can be acquired. According to an embodiment of the present technology, instinctive and easy-to-understand display can be provided even in an environment where visual observation is difficult with a liquid crystal panel, and the like. The above-described first to tenth embodiments, the processing performed by the image processing devices can be executed by hardware or software. When processing by software is executed, a program in which a processing sequence is recorded is installed into a memory of a control unit of an imaging device and executed.

For example, the program can be recorded in a recording medium, such as a hard disk or a ROM, in advance. Alternatively, the program can be recorded in a recording medium, such as a compact disc read only memory (CD- ROM), a digital versatile disc (DVD), or a semiconductor memory. Such a recording medium can be provided as packaged software. The user installs the packages software in the imaging device.

Note that the program that is provided in the Internet as an application can be transferred and installed to the imaging device, in addition to installation from the above-described recording medium to the imaging device.

11. Modification

As described above, embodiments of the present technology have been specifically described. However, the present technology is not limited to these embodiments, and various modifications based on the technical idea of the present technology is possible.

In the above-described embodiments, description has been given taking a case of applying the present technology to an image acquired in an imaging device as an example. However, the present technology is also applicable to a moving image.

Further, the above first to tenth embodiments may be combined and implemented. For example, the graph display of blur information in the first embodiment and the enlargement display in the second embodiment are combined, and a graph is displayed while a part of an image is enlarged and displayed.

Further, the object is not limited to a person or a human of a person, and the above-described processing may be performed using a dog, a cat, a flower, a dish, or the like, as the object, using a dog/cat face detection function, a flower detection function, a dish detection function, or the like.

Further, the present technology may employ the following configurations.

(1) An information processing system including: circuitry configured to perform predetermined processing based on out-of-focus information corresponding to a first area of an image, the out-of-focus information corresponding to a difference in focus between the first area of the image and a second area of the image that is different from the first area of the image.

(2) The system of (1), wherein the circuitry is configured to: identify the first area of the image; and acquire the out-of-focus information corresponding to the first area of the image.

(3) The system of any of (1) to (2), wherein the second area of the image is an in-focus area of the image.

(4) The system of (1) to (3), wherein the system includes: a first information processing apparatus; and a second information processing apparatus configured to be connected to the first information processing apparatus.

(5) The system of any of (1) to (4), wherein the predetermined processing includes outputting a notification corresponding to the out-of focus information.

(6) The system of any of (1) to (5), wherein the predetermined processing includes controlling a display to display a notification indicating an out-of-focus amount based on the out-of-focus information.

(7) The system of (6), wherein the circuitry is configured to control the display to display the image and the notification simultaneously.

(8) The system of any of (6) to (7), wherein the circuitry is configured to control the display to display the image with the notification superimposed on the displayed image.

(9) The system of any of (1) to (8), wherein the predetermined processing includes controlling a display to display a bar graph indicating an out-of-focus amount based on the out-of-focus information.

(10) The system of (9), wherein a height of the bar graph corresponds to a range of an out-of-focus amount that may be realized based on at least one of the second area, a focal distance and a maximum aperture of a lens capturing the image.

(11) The system of any of (1) to (10), wherein the predetermined processing includes controlling a display to display an enlarged version of the image including the first area and the second area.

(12) The system of (11), wherein an enlargement range of the enlarged version of the image is set so that a display area corresponding to the first area and a display area corresponding to the second area are substantially similar.

(13) The system of any of (11) to (12), wherein the circuitry is configured to control the display to display the image and the enlarged version of the image simultaneously.

(14) The system of any of (11) to (13), wherein the circuitry is configured to control the display to display the enlarged version of the image superimposed on the image.

(15) The system of any of (1) to (14), wherein the predetermined processing includes controlling a display to display the image while applying a graphical effect to the first area of the image.

(16) The system of any of (1) to (15), wherein the predetermined processing includes trimming the image based on the out-of-focus information.

(17) The system of (16), wherein the circuitry is configured to control a display to display the trimmed image.

(18) The system of any of (1) to (17), wherein the predetermined processing includes generating a first trimmed version of the image and a second trimmed version of the image based on the out-of-focus information.

(19) The system of any of (1) to (18), wherein the predetermined processing includes generating a first trimmed version of the image and a second trimmed version of the image based on the out-of-focus information.

(20) The system of (19), wherein the circuitry is configured to control a display to display the first trimmed version of the image and the second trimmed version of the image.

(21) The system of (4), wherein the first information processing apparatus is configured to: identify the second area of the image; acquire the out-of-focus information; and transmit the out-of-focus information to the second information processing apparatus.

(22) The system of (21), wherein the second information processing apparatus is configured to: perform the predetermined processing; and transmit a result of the predetermined processing to the first information processing apparatus.

(23) An information processing system including: circuitry configured to identify a first area of an image; acquire out-of-focus information corresponding to a second area of an image that is different from the first area of the image; and perform predetermined processing based on the out-of-focus information.

(24) An information processing method including: performing predetermined processing based on out-of-focus information corresponding to a first area of an image, the out-of-focus information corresponding to a difference in focus between the first area of the image and a second area of the image that is different from the first area of the image.

(25) A non-transitory computer-readable medium including computer-program instructions, which when executed by a system, cause the system to: perform predetermined processing based on out-of-focus information corresponding to a first area of an image, the out-of-focus information corresponding to a difference in focus between the first area of the image and a second area of the image that is different from the first area of the image.

(26) An image processing device including:
an attention area determination unit configured to determine an attention area that is an area of an object of attention in an image acquired by an imaging device; a blur information acquisition unit configured to acquire blur information of a non-attention area that is an area other than the attention area in the image; and a blur related processing unit configured to perform predetermined processing based on the blur information.

(27) The image processing device according to (26), wherein the blur related processing unit enlarges an area including the attention area and the non-attention area and displays the enlarged area in a display unit in the image.

(28) The image processing device according to (26) or (27), wherein the blur related processing unit displays a blur adjustment user interface for adjusting the degree of blur in the image in the display unit.

(29) The image processing device according any of (26) to (28), wherein the blur related processing unit applies blur processing to the image, and displays the present image and the image to which the blur processing has been applied in the display unit.

(30) The image processing device according to any of (26) to (29), wherein the blur related processing unit determines a composition of the image, determines a recommended blur amount in the composition, and emphasizes the degree of blur in the non-attention area of an image to be displayed in the display unit based on the recommended blur amount in the composition of the image and the blur information of the non-attention area of the image and displays the image.

(31) The image processing device according to any of (26) to (30), wherein the blur related processing unit determines a segmentation range of the image based on the blur information, and segments the segmentation range from the image.

(32) The image processing device according to (31), wherein the blur related processing unit determines the segmentation range based on the degree of separation of the blur information of the attention area and the non-attention area in the segmentation range.

(33) The image processing device according to (31) or (32), wherein, when there is a plurality of the segmentation ranges, the blur related processing unit segments an image with respect to each of the plurality of segmentation ranges, and generates a plurality of segmentation images.

(34) The image processing device according to any of (26) to (33), wherein the blur related processing unit performs image capturing operation control that operates the imaging device in a bracket image capturing mode to acquire a plurality of images having different diaphragm aperture diameters by a single image capturing operation, based on the blur information.

(35) The image processing device according to (34), wherein, when the blur amount is a predetermined amount or less, the blur related processing unit operates the imaging device in the bracket image capturing mode in which the diaphragm aperture diameter is changed in a direction of becoming larger.

(36) The image processing device according to (34), wherein, when the blur amount is a predetermined amount or more, the blur related processing unit operates the imaging device in the bracket image capturing mode in which the diaphragm aperture diameter is changed in a direction of becoming smaller.

(37) The image processing device according to any of (26) to (36), wherein the blur related processing unit performs, according to the blur information of a captured image acquired by the imaging device, image processing of emphasizing the degree of blur of the non-attention area of the captured image.

(38) The image processing device according to any of (26) to (37), wherein the blur related processing unit displays a graph indicating the blur information in the display unit.

(39) The image processing device according to any of (26) to (38), wherein the blur related processing unit displays a histogram indicating the blur information in the display unit.

(40) The image processing device according to any of (26) to (39), wherein the blur information is an actual blur amount in the non-attention area of the image.

(41) The image processing device according to any of (26) to (39), wherein the blur information is a blur prediction amount of the non-attention area on an assumption that the imaging device has focused the attention area.

(42) A method of processing an image including: determining an attention area that is an area of an object of attention in an image acquired by an imaging device; acquiring blur information of a non-attention area that is an area other than the attention area in the image; and performing predetermined processing based on the blur information.

(43) An image processing program for causing a computer to execute a method of processing an image, the method including: determining an attention area that is an area of an object of attention in an image acquired by an imaging device; acquiring blur information of a non-attention area that is an area other than the attention area in the image; and performing predetermined processing based on the blur information.

(44) An imaging device including: an image capturing unit configured to receive light through an optical system, and to generate an image; an attention area determination unit configured to determine an attention area that is an area of an object of attention, in the image; a blur information acquisition unit configured to acquire blur information of a non-attention area that is an area other than the attention area in the image; and a blur related processing unit configured to perform predetermined processing based on the blur information. It should be understood by those skilled in the art that various modifications, combinations, sub-combinations and alterations may occur depending on design requirements and other factors insofar as they are within the scope of the appended claims or the equivalents thereof. It should be understood by those skilled in the art that various modifications, combinations, sub-combinations and alterations may occur depending on design requirements and other factors insofar as they are within the scope of the appended claims or the equivalents thereof.

REFERENCE SIGNS LIST 1, 2, 3, 4, 5, 6, 7, 8, 9, and 10 Image processing device
11 Attention area determination unit
12 Blur information acquisition unit
13, 23, 33, 43, 53, 63, 73, 83, 93, and 103 Blur related processing unit
1007 Display unit
1003 Imaging element
1100, 1200, 1300, 1400, 1500, 1600, 1700, 1800, 1900, and
2000 Imaging device

The invention claimed is:

1. An image capturing apparatus comprising:
an imaging element configured to generate an image;
an image memory; and
circuitry configured to
retrieve, in an absence of an image capture operation, the image temporarily stored in the image memory,
perform predetermined processing based on out-of-focus information corresponding to a first area of the image, the out-of-focus information corresponding to a difference in focus between the first area of the image and a second area of the image that is different from the first area of the image,
perform the image capture operation after performing the predetermined processing, and
record a captured image based on the image capture operation that is performed after performing the predetermined processing.

2. The image capturing apparatus of claim 1, wherein the circuitry is configured to:
identify the first area of the image,
determine first focus information associated with the first area,
identify the second area of the image that is different from the first area of the image,
determine second focus information associated with the second area, and
acquire the out-of-focus information corresponding to the first area of the image by determining the difference in focus based on a difference between the first focus information and the second focus information.

3. The image capturing apparatus of claim 2, wherein the second area of the image is an in-focus area of the image.

4. The image capturing apparatus of claim 3, wherein the predetermined processing includes outputting a notification corresponding to the out-of-focus information.

5. The image capturing apparatus of claim 2, wherein the predetermined processing includes controlling a display to display a notification indicating an out-of-focus amount based on the out-of-focus information.

6. The image capturing apparatus of claim 5, wherein the circuitry is configured to control the display to display the image and the notification simultaneously.

7. The image capturing apparatus of claim 5, wherein the circuitry is configured to control the display to display the image with the notification superimposed on the displayed image.

8. The image capturing apparatus of claim 1, wherein the predetermined processing includes controlling a display to display a bar graph indicating an out-of-focus amount based on the out-of-focus information.

9. The image capturing apparatus of claim 8, wherein a height of the bar graph corresponds to a range of the out-of-focus amount that may be realized based on at least one of the second area, a focal distance and a maximum aperture of a lens capturing the image.

10. The image capturing apparatus of claim 1, wherein the predetermined processing includes controlling a display to display an enlarged version of the image including the first area and the second area.

11. The image capturing apparatus of claim 10, wherein an enlargement range of the enlarged version of the image is set so that a first display area corresponding to the first area and a second display area corresponding to the second area are substantially similar.

12. The image capturing apparatus of claim 10, wherein the circuitry is configured to control the display to display the image and the enlarged version of the image simultaneously.

13. The image capturing apparatus of claim 10, wherein the circuitry is configured to control the display to display the enlarged version of the image superimposed on the image.

14. The image capturing apparatus of claim 1, wherein the predetermined processing includes controlling a display to display the image while applying a graphical effect to the first area of the image.

15. The image capturing apparatus of claim 1, wherein the predetermined processing includes trimming the image based on the out-of-focus information.

16. The image capturing apparatus of claim 15, wherein the circuitry is configured to control a display to display the trimmed image.

17. The image capturing apparatus of claim 1, wherein the predetermined processing includes generating a first trimmed version of the image and a second trimmed version of the image based on the out-of-focus information.

18. The image capturing apparatus of claim 1, wherein the predetermined processing includes generating a first trimmed version of the image and a second trimmed version of the image based on the out-of-focus information.

19. The image capturing apparatus of claim 18, wherein the circuitry is configured to control a display to display the first trimmed version of the image and the second trimmed version of the image.

20. An information processing method comprising:
generating, with an imaging element, an image;
retrieving, with circuitry and in an absence of an image capture operation, the image that is temporarily stored in an image memory;
identifying, with the circuitry, a first area of the image;
performing, with the circuitry, predetermined processing based on out-of-focus information corresponding to the first area of the image, the out-of-focus information corresponding to a difference in focus between the first area of the image and a second area of the image that is different from the first area of the image;
performing, with the circuitry, the image capture operation after performing the predetermined processing; and
recording, with the circuitry, a captured image based on the image capture operation that is performed after performing the predetermined processing.

21. A non-transitory computer-readable medium including computer-program instructions that, when executed by an electronic processor, cause the electronic processor to perform a set of operations comprising:
controlling an imaging element to generate an image;
retrieving, in an absence of an image capture operation, the image temporarily stored in an image memory;
identifying a first area of the image;
performing predetermined processing based on out-of-focus information corresponding to the first area of the image, the out-of-focus information corresponding to a difference in focus between the first area of the image and a second area of the image that is different from the first area of the image;

performing the image capture operation after performing the predetermined processing; and recording a captured image based on the image capture operation that is performed after performing the predetermined processing.

* * * * *